US012602964B2

(12) United States Patent
Nakagami et al.

(10) Patent No.: US 12,602,964 B2
(45) Date of Patent: Apr. 14, 2026

(54) ITEM TAKE-OUT APPARATUS AND ITEM TAKE-OUT SYSTEM

(71) Applicant: Glory Ltd., Himeji (JP)

(72) Inventors: Noriyuki Nakagami, Himeji (JP); Osamu Ito, Himeji (JP); Andreas Steinlin, Himeji (JP)

(73) Assignee: GLORY LTD., Himeji (JP)

( * ) Notice: Subject to any disclaimer, the term of this patent is extended or adjusted under 35 U.S.C. 154(b) by 125 days.

(21) Appl. No.: 18/212,196

(22) Filed: Jun. 21, 2023

(65) Prior Publication Data

US 2023/0334932 A1 Oct. 19, 2023

Related U.S. Application Data

(63) Continuation of application No. PCT/JP2021/044118, filed on Dec. 1, 2021.

(30) Foreign Application Priority Data

Dec. 22, 2020 (JP) ................................ 2020-212425

(51) Int. Cl.
*G07F 9/10* (2006.01)
*G07F 11/16* (2006.01)

(52) U.S. Cl.
CPC .............. *G07F 11/165* (2013.01); *G07F 9/10* (2013.01)

(58) Field of Classification Search
CPC .................................................... G07F 11/165
See application file for complete search history.

(56) References Cited

U.S. PATENT DOCUMENTS

2009/0108015 A1* 4/2009 Kreamer ................ G07F 17/40
705/17
2011/0204075 A1 8/2011 Davis, Jr.
2018/0293831 A1 10/2018 Takeuchi et al.
2019/0278274 A1 9/2019 Igata et al.
2020/0002094 A1 1/2020 Schedlbauer et al.
2020/0234263 A1 7/2020 Wang
(Continued)

FOREIGN PATENT DOCUMENTS

JP S57-126324 A 8/1982
JP H02-042562 U 3/1990
(Continued)

OTHER PUBLICATIONS

European Search Report issued Jul. 22, 2024 in European Application No. EP 21910184.7.
(Continued)

*Primary Examiner* — Gene O Crawford
*Assistant Examiner* — Ayodeji T Ojofeitimi
(74) *Attorney, Agent, or Firm* — XSENSUS LLP

(57) ABSTRACT

In order for various styles of selling items in stores, an item take-out apparatus from which a user takes out an item is provides with: a storage unit that stores items therein; a plurality of take-out ports through which the user takes out an item from inside the item take-out apparatus; and a transport unit configured to extract an item from the storage unit and transport the item to any of the plurality of take-out ports. The transport unit transports an item designated by the user to a take-out port, through which the user takes out the item, among the plurality of take-out ports.

11 Claims, 18 Drawing Sheets

(56) References Cited

U.S. PATENT DOCUMENTS

| | | | | |
|---|---|---|---|---|
| 2021/0061564 | A1 | 3/2021 | Ibe | |
| 2021/0073765 | A1* | 3/2021 | Xu | G07F 9/009 |

FOREIGN PATENT DOCUMENTS

| | | | |
|---|---|---|---|
| JP | H11-249238 | A | 9/1999 |
| JP | 2009-266162 | A | 11/2009 |
| JP | 2012-161414 | A | 8/2012 |
| JP | 2016-091442 | A | 5/2016 |
| JP | 2019-121013 | A | 7/2019 |
| JP | 2019-153211 | A | 9/2019 |
| WO | 2017/104004 | A1 | 6/2017 |

OTHER PUBLICATIONS

International Search Report and Written Opinion mailed on Feb. 22, 2022, received for PCT Application PCT/JP2021/044118, filed on Dec. 1, 2021, 13 pages including English Translation.

* cited by examiner

ITEM TAKE-OUT APPARATUS AND ITEM TAKE-OUT SYSTEM

CROSS-REFERENCE TO RELATED APPLICATIONS

The present application is a bypass continuation of, and claims priority to, International application PCT/JP2021/044118 having the above title, filed Dec. 1, 2021, the entire contents of which is incorporated herein by reference. PCT/JP2021/044118 claims priority to JP2020-212425, filed Dec. 22, 2020, the entire contents of which is incorporated herein by reference.

TECHNICAL FIELD

The present disclosure relates to an item take-out apparatus and an item take-out system that allow a user to take out an item stored in the apparatus to the outside of the apparatus.

BACKGROUND ART

Conventionally, a variety of apparatus that enable a user to select an item from among a plurality of kinds of items stored in the apparatus and take out the selected item to the outside of the apparatus, have been used. For example, Japanese Laid-Open Patent Publication No. 2009-266162 discloses a vending machine that stores items in a plurality of storage racks, and takes out by an arm, from a storage rack, an item selected by a user and discharges the item to the outside of the machine through an item pick-up port.

SUMMARY

In the conventional art described above, for example, the apparatus is installed on a counter of a store with the item pick-up port facing a customer. When a clerk faces the customer across the counter, the clerk present on the back side of the apparatus cannot take out an item from the item pick-up port on the front side of the apparatus.

The present disclosure is made in view of the conventional art including the above problem, and one object of the present disclosure is to provide an item take-out apparatus and an item take-out system capable of dealing with various styles of selling items in stores.

An item take-out apparatus according to one aspect of the present disclosure is an apparatus from which a user takes out an item. The apparatus includes: a storage unit configured to store items therein; a plurality of take-out ports through which the user takes out an item from inside the item take-out apparatus; and a transport unit configured to extract an item from the storage unit and transport the item to any of the plurality of take-out ports. The transport unit may transport an item designated by the user to a take-out port, through which the user takes out the item, among the plurality of take-out ports. The user includes a clerk and a customer, for example. The objects, features, advantages and technical and industrial significance of this disclosure will be better understood by the following description and the accompanying drawings of the disclosure.

DESCRIPTION OF EMBODIMENTS

Figure 1:
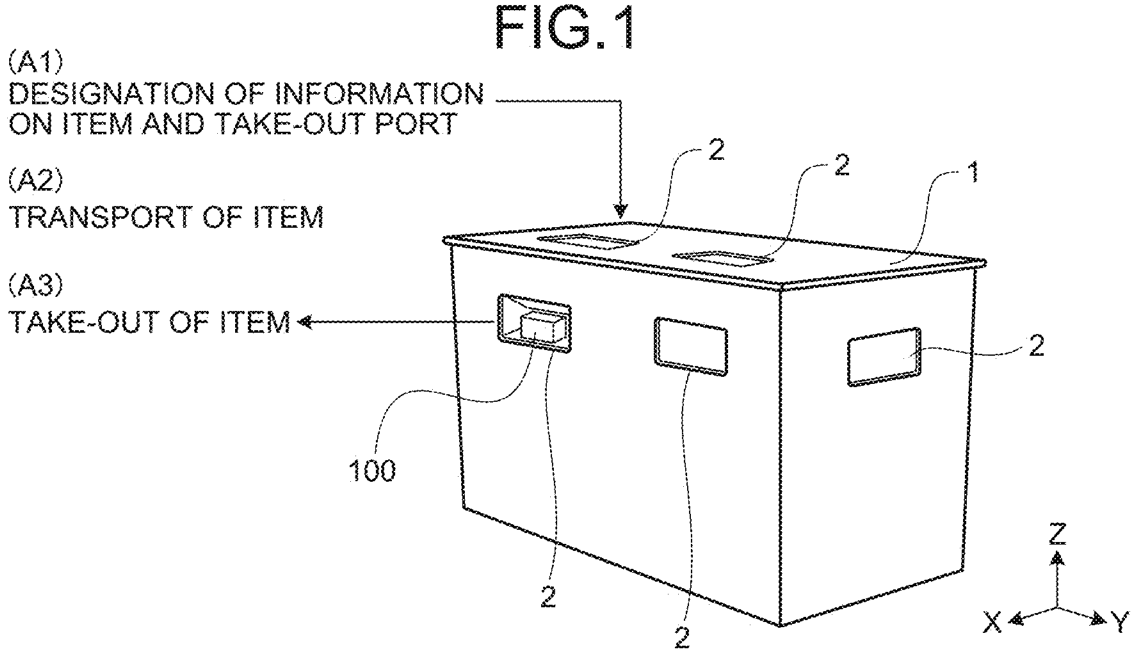
FIG. 1 is a schematic diagram illustrating an outline of an item take-out apparatus according to an embodiment of the present disclosure.

Hereinafter, an embodiment of an item take-out apparatus and an item take-out system according to the present disclosure will be described with reference to the drawings. FIG. 1 is a schematic diagram illustrating an outline of an item take-out apparatus 1 according to the present embodiment. The item take-out apparatus 1 is installed in a store in which items are sold, and is used by a clerk or a customer (hereinafter referred to as "user") to take out an item that the customer purchases. Coordinate axes in the drawings showing the configuration of the item take-out apparatus 1 of the present embodiment indicate the relationship of the components of the item take-out apparatus 1 shown in each drawing. A Z-axis direction corresponds to an up-down direction, and an XY plane corresponds to a horizontal plane. The directions shown in each drawing are examples and do not limit the installation method for the respective components and the directions of the components during operations.

A plurality of kinds of items are stored in the item take-out apparatus 1. The item take-out apparatus 1 is provided with a plurality of take-out ports 2 for the user to take out items from the item take-out apparatus 1. FIG. 1 shows an example of take-out ports 2 of the item take-out apparatus 1.

A take-out port 2 is disposed in at least one surface out of six surfaces including four side surfaces (i.e., a front surface, a back surface, a left-side surface, and a right-side surface), an upper surface, and a lower surface of the item take-out apparatus 1. Take-out ports 2 may be disposed in a plurality of surfaces constituting a housing of the item take-out apparatus 1. One or a plurality of take-out ports 2 are disposed in one surface. A plurality of take-out ports 2 may allow the user to take out an item from the item take-out apparatus 1 in a plurality of different directions. A surface in which the take-out port 2 is formed is not particularly limited. Also, the positions and the number of the take-out ports 2 in each surface are not particularly limited. The take-out ports 2 are disposed in the item take-out apparatus 1 according to the usage method of the item take-out apparatus 1 in the store.

As shown in FIG. 1, the item take-out apparatus 1 can receive an input of information designating an item, and an input of information designating a take-out port 2 from which the designated item is taken out from the apparatus (A1). The information inputting method is not limited. For example, the item take-out apparatus 1 may include an operation unit by which the user performs the designation, and the designation information may be inputted to the item take-out apparatus 1 from the operation unit. For example, the user may operate an operation unit included in an external apparatus such as an operation terminal or a cash register to perform the designation, and the designation information is inputted to the item take-out apparatus 1 from the external device.

Based on the inputted information, the item take-out apparatus 1 transports the item designated from among the items stored in the apparatus, to the designated take-out port 2 (A2). Thus, the user can take out the desired item from the desired take-out port 2 (A3).

Each take-out port 2 may be always opened, or may be opened and closed by a shutter. The shutter may be slidably moved to open and close the take-out port 2. The shutter may be pivoted inward and/or outward with respect to the take-out port 2 to open and close the take-out port 2. The shutter may be manually opened and closed by the user. The shutter may be automatically opened and closed by the item take-out apparatus 1. For example, the shutters of the take-out ports 2 may be usually closed, and after transporting the designated item 100 to the designated take-out port 2, the item take-out apparatus 1 may automatically open the shutter of the take-out port 2 to which the item 100 has been transported. In this case, for example, a sensor not shown in FIG. 1 may be disposed at the take-out port 2, and the item take-out apparatus 1 may automatically close the shutter upon detecting, by the sensor, that the item 100 has been taken out from the take-out port 2.

The user may not necessarily designate both an item and a take-out port 2, and may designate only an item. In this case, the item take-out apparatus 1 may automatically specifies a take-out port 2 corresponding to the designated item, and transport the designated item to the specified take-out port 2.

For example, information on correspondence between the kinds of items and the take-out ports 2 may be prepared in advance, and a take-out port 2 may be specified according to an item designated by the user, based on the information. It may be set that an item, for which a customer is required to satisfy a specific condition such as an age restriction to purchase the item, is transported to a take-out port 2 facing a clerk 200. A plurality of operation units to be input sources of item designating information may be disposed, information indicating correspondence between the operation units and the take-out ports 2 may be prepared in advance, and a take-out port 2 corresponding to an operation unit by which an item designating operation has been performed may be specified based on the information. The take-out port 2 may be specified by the item take-out apparatus 1, or may be specified by an external apparatus connected to the item take-out apparatus 1.

Although the counter-type item take-out apparatus 1 is shown in FIG. 1, the configuration of the item take-out apparatus 1 is not limited thereto. Although the item take-out apparatus 1 shown in FIG. 1 has a height that allows an external apparatus such as a cash register or an operation terminal to be disposed and used on the upper surface thereof, the height of the item take-out apparatus 1 is not particularly limited. Also, the dimensions of the item take-out apparatus 1 in the left-right direction and front-rear direction are not particularly limited.

Figure 2:
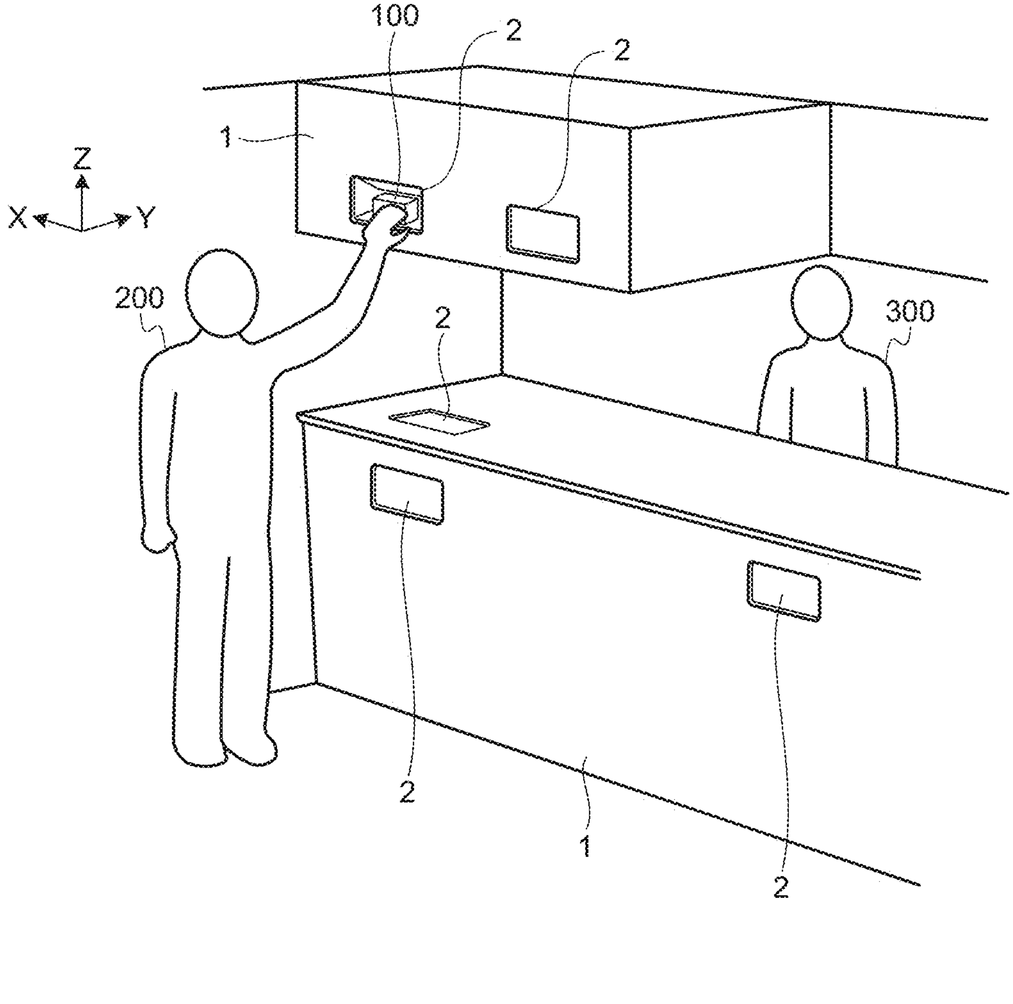
FIG. 2 is a schematic diagram illustrating examples of the item take-out apparatus.

The item take-out apparatus 1 may not necessarily be installed on the floor. FIG. 2 is a schematic diagram illustrating examples of the item take-out apparatus 1. FIG. 2 shows a counter-type item take-out apparatus 1 installed on the floor, and a hanging-type item take-out apparatus 1 disposed at a position away from the floor. The hanging-type item take-out apparatus 1 may be hung from the ceiling of the store, or may be fixed to a wall surface of the store.

The clerk 200 may serve a customer 300 over the counter-type item take-out apparatus 1 and take out an item that the customer 300 purchases, from a take-out port 2 of the item take-out apparatus 1. The item take-out apparatus 1 may have a take-out port 2 in the side surface on the customer 300 side, and the customer may take out the item from the take-out port 2 by himself/herself.

Also, as shown in FIG. 2, the clerk 200 may take out an item 100 that the customer 300 purchases, from a take-out port 2 of the hanging-type item take-out apparatus 1. The hanging-type item take-out apparatus 1 may have a take-out port 2 in the lower surface thereof, and the clerk 200 may take out the item 100 from the lower surface of the item take-out apparatus 1.

Figure 3:
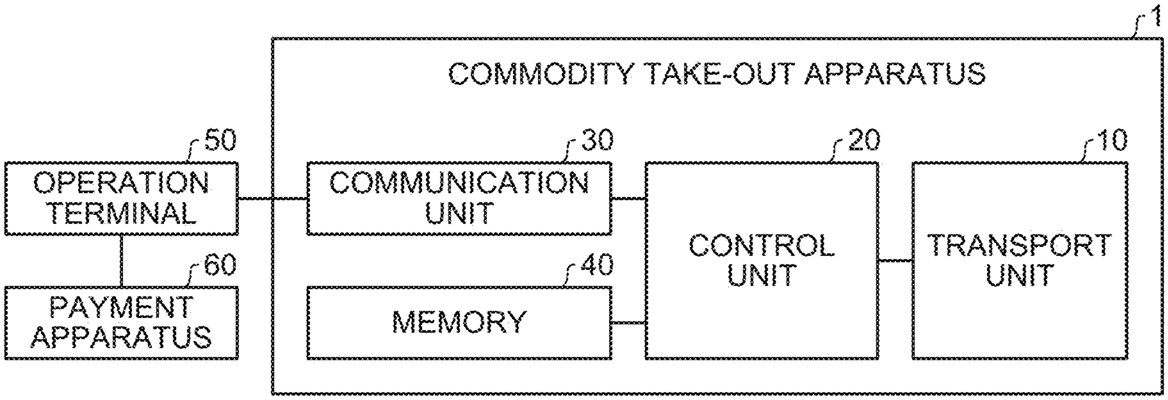
FIG. 3 is a block diagram schematically showing the configuration of the item take-out apparatus.

FIG. 3 is a block diagram schematically showing the configuration of the item take-out apparatus 1. The item take-out apparatus 1 includes a transport unit 10, a control unit 20, a communication unit 30, and a memory 40. The transport unit 10 extracts an item from a storage unit inside the apparatus and transports the item to a take-out port 2, which will be described in detail later.

The memory 40 is a non-volatile storage apparatus. The memory 40 is used to store information necessary for operations of the item take-out apparatus 1. For example, information indicating correspondence between a plurality of storage units inside the apparatus and the kinds of items stored in the respective storage units, is stored in the memory 40. For example, information indicating correspondence between a plurality of kinds of items and a plurality of take-out ports 2 is stored in the memory 40. For example, information indicating correspondence between a plurality of operation units and a plurality of take-out ports 2 is stored in the memory 40. The plurality of operation units may include an operation unit of an external apparatus.

The communication unit 30 exchanges information with external apparatuses through wired communication or wireless communication. For example, an item take-out system includes the external apparatuses and the item take-out apparatus 1. An operation terminal 50 is an example of the external apparatuses. The communication unit 30 can receive information indicating an item and a take-out port 2 designated by the user, from the operation terminal 50 serving as an operation unit. For example, a tablet-type computer terminal including an operation unit and a display unit is used as the operation terminal 50. For example, a cash register including an operation unit and a display unit is used as the operation terminal 50.

Based on the information received by the communication unit 30 and the information stored in the memory 40, the control unit 20 specifies the position of a storage unit in which the item is stored and a take-out port 2 to be a destination of the item. The control unit 20 controls the transport unit 10 to extract the item from the specified storage unit, and transport the item to the specified take-out port 2. The control unit 20 controlling the respective units based on the information inputted from outside and the information stored in the memory 40, realizes the functions and operations of the item take-out apparatus 1 described in the present embodiment.

As shown in FIG. 3, the operation terminal 50 may be connected to a payment apparatus 60 that performs a payment process on an item price. For example, a cash register serving as the payment apparatus 60 is connected to a computer terminal serving as the operation terminal 50. For example, a money handling apparatus serving as the payment apparatus 60 is connected to a cash register serving as the operation terminal 50.

The payment apparatus 60 is not limited to an apparatus performing a cash payment process, and may be an apparatus performing an electronic payment process, instead of or in addition to the cash payment process. For example, the payment apparatus 60 may perform the item price payment process by an electronic payment using a debit card, a credit card, a prepaid card, electronic money, etc.

The item take-out apparatus 1 may transport the item to the take-out port 2, on the condition that the payment apparatus 60 has completed the item price payment process. For example, the payment apparatus 60 inputs, to the operation terminal 50, information indicating that the payment for purchasing an item has been completed, and the operation terminal 50 inputs, to the item take-out apparatus 1, information designating the item that has been purchased. Then, the item take-out apparatus 1 transports the designated item to the take-out port 2.

At least one of the operation terminal 50 and the payment apparatus 60 may serve as a confirmation apparatus that confirms whether or not a customer has purchase eligibility for purchasing an item. The purchase eligibility is required for some items, and these items can be purchased only by customers having the purchase eligibility. In the memory 40, information indicating the kinds of items for which the purchase eligibility is required is stored in advance. Based on the information in the memory 40, the item take-out apparatus 1 determines whether or not the purchase eligibility is required for the item designated by using the operation terminal 50. Upon detecting that the purchase eligibility is required for the designated item, the item take-out apparatus 1 performs a notification process for requesting confirmation of whether or not the customer has the purchase eligibility. For example, information instructing the operation for confirming the purchase eligibility of the customer is displayed on the display unit of the operation terminal 50.

There are items, for which the age of purchasers is restricted, such as tobacco and alcoholic beverages. When such an item has been designated, the confirmation apparatus performs a confirmation process of confirming with a certificate that the age of the purchaser exceeds a predetermined age. A driver's license or the like issued by a public organization is used as the certificate.

For example, the clerk recognizes that the confirmation process is required and then asks the customer purchasing the item, for which purchase eligibility is required, to present a certificate. The clerk visually checks the certificate and performs a predetermined operation by using the confirmation apparatus to complete the confirmation process.

For example, the confirmation apparatus may include a reading device capable of reading information on the certificate. The customer uses the reading device to read the information on the certificate. Based on the information on the certificate read by the reading device, the confirmation apparatus determines whether or not the customer has the purchase eligibility for the item to complete the confirmation process. If the purchase eligibility is recorded on a card type medium such as a magnetic card or an IC card, the confirmation process is performed by using a reading device that reads information from the medium. If the purchase eligibility is to be confirmed by using a portable communication terminal such as a smartphone of the customer, the confirmation process is performed by using a reading device capable of obtaining information from the portable communication terminal.

There are items, for which purchasers are restricted, such as pharmaceutical products that only persons having prescriptions can purchase. When such an item has been designated, the confirmation apparatus confirms that the customer has the purchase eligibility for the item, through the reading device or the visual check by the clerk as described above, to complete the confirmation process.

The result of the confirmation process is inputted to the item take-out apparatus 1 from the confirmation apparatus, i.e., at least one of the operation terminal 50 and the payment apparatus 60, having finished the confirmation process. The item take-out apparatus 1 transports the item to the take-out port 2 on the condition that it has been confirmed by using the operation terminal 50 and/or the payment apparatus 60 that the customer has the purchase eligibility for the item.

The item take-out apparatus 1 may not necessarily detect an item for which purchase eligibility is required, and the operation terminal 50 or the payment apparatus 60 may start the confirmation process upon detecting an item for which purchase eligibility is required. In this case, for example, the operation terminal 50 or the payment apparatus 60 obtains the result of the confirmation process, and then the operation terminal 50 inputs information designating the item to the item take-out apparatus 1. After receiving the information, the item take-out apparatus 1 can transport the designated item to the take-out port 2.

The configuration shown in FIG. 3 is an example, and does not limit the configuration of the item take-out apparatus 1 and the apparatuses connected to and used with the item take-out apparatus 1. Distributed or integrated forms of each apparatus are not limited to the above example, and all or some of the forms may be distributed or integrated functionally or physically in any unit depending on various loads, use statuses, or the like. For example, the item take-out apparatus 1 may include an operation unit, and the item take-out apparatus 1 may realize the function of the operation terminal 50 described in the present embodiment. For another example, the operation terminal 50 may also serve as the payment apparatus 60.

Figure 4:
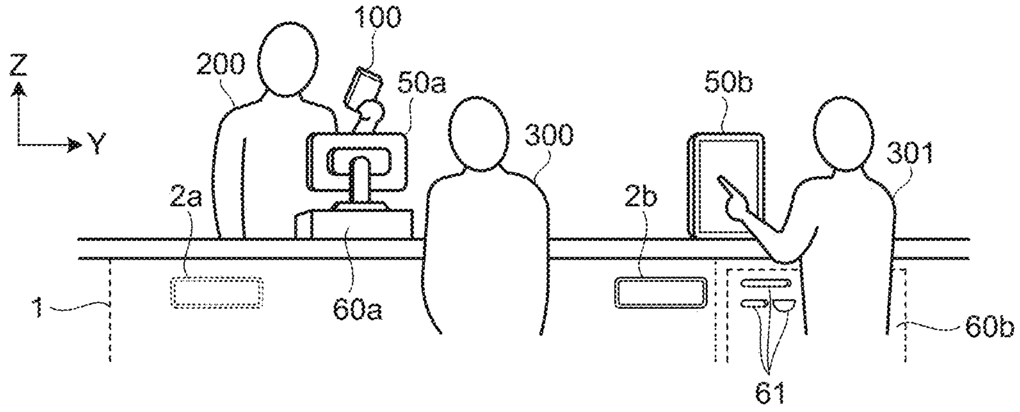
FIG. 4 is a schematic diagram illustrating an example of the item take-out apparatus used in a store.

Next, usage examples of the item take-out apparatus 1 will be described. FIG. 4 is a schematic diagram illustrating an example of the item take-out apparatus 1 used in the store. In the example shown in FIG. 4, the item take-out apparatus 1 is installed at a checkout counter of the store, and is used with a plurality of operation terminals 50 (50*a*, 50*b*) and a plurality of payment apparatuses 60 (60*a*, 60*b*) connected to the apparatus 1. The clerk 200 faces the customer 300 across the item take-out apparatus 1 that separates them. The item take-out apparatus 1 has a plurality of take-out ports 2 (2*a*, 2*b*). The take-out port 2*a* is disposed on the side surface of the clerk 200 side, and the take-out port 2*b* is disposed on the side surface of the customer 300 side.

The clerk 200 serving the customer 300 operates the operation terminal 50*a* installed on the item take-out apparatus 1 to designate an item that the customer 300 purchases. In addition, the clerk 200 performs a payment process for the price of the item that the customer 300 purchases, by using the operation terminal 50*a* and the payment apparatus 60*a*. For example, the clerk 200 deposits cash received from the customer 300 into the payment apparatus 60*a*, and returns change dispensed from the payment apparatus 60*a* to the customer 300 according to need. For example, according to a request of the customer 300, the item price payment process may be performed by electronic payment in the payment apparatus 60.

If the customer 300 desires to purchase an item for which purchase eligibility is required, a confirmation process for the purchase eligibility is performed. For example, the clerk 200 asks the customer 300 to present a certificate. In the confirmation process, the clerk 200 visually checks the certificate to confirm that the customer 300 has the purchase eligibility for the item. Alternatively, in the confirmation process, the customer 300 causes the reading device connected to the operation terminal 50*a* or the payment apparatus 60*a* to read information from the certificate, for example. After performing the confirmation process through the visual check or the reading device, the item can be taken out from the item take-out apparatus 1 on the condition that a confirmation result indicating that the customer 300 has the purchase eligibility has been obtained.

In the memory 40 of the item take-out apparatus 1, storage information indicating correspondence between the kinds of items and their respective storage units inside the apparatus is stored in advance. Furthermore, take-out information in which the operation terminal 50*a* is associated with the take-out port 2*a* and the operation terminal 50*b* is associated with the take-out port 2*b*, is stored in the memory 40. Based on the storage information and the take-out information, the control unit 20 of the item take-out apparatus 1 specifies the storage unit in which the item designated by using the operation terminal 50*a* is stored, and specifies the take-out port 2*a* associated with the operation terminal 50*a*.

The control unit 20 controls the transport unit 10 to extract the item from the specified storage unit, and transport the item to the take-out port 2*a*. The control unit 20 performs a notification process for notifying the clerk 200 that the item has been transported to the take-out port 2*a*. In the notification process, for example, information indicating that the item can be taken out from the take-out port 2*a* is displayed on the display unit of the operation terminal 50*a*. Upon checking the display, the clerk 200 takes out the item 100 from the take-out port 2*a* and passes the item 100 to the customer 300 as shown in FIG. 4 to complete the transaction.

A self-transaction, in which a customer 301 purchases an item by himself/herself without being served by the clerk 200, may also be performed. As shown in FIG. 4, a payment apparatus 60*b* is installed in the counter. An inlet/outlet 61 of the payment apparatus 60*b* is disposed on the side surface, of the counter, including the take-out port 2*b* for self-transaction. The customer 301 can deposit banknotes and coins to be paid for the item, from the inlet/outlet 61, into the payment apparatus 60*b*. The customer 301 can receive banknotes and coins dispensed as change from the inlet/outlet 61 of the payment apparatus 60*b*.

The customer 301 selects an item by operating the operation terminal 50*b*, and performs a payment process for the price of the item by using the payment apparatus 60*b*. For example, the customer 301 deposits cash to be paid for purchasing the item into the payment apparatus 60*b*, and receives change dispensed from the payment apparatus 60*b*. For example, the customer 301 operates the operation terminal 50*b* to pay for the item by electronic payment.

When the customer 301 has operated the operation terminal 50*b* and selected an item for which purchase eligibility is required, the operation terminal 50*b* starts a confirmation process for the purchase eligibility. The confirmation process is performed by the customer 301 by causing the reading device of the operation terminal 50*b* to read information from a certificate of the customer 301. Only when the confirmation result of the confirmation process indicates that the customer 301 has the purchase eligibility, the customer 301 is allowed to take out the item from the item take-out apparatus 1.

With reference to the storage information and the take-out information stored in the memory 40, the control unit 20 of the item take-out apparatus 1 specifies the storage unit in which the item designated by the customer 301 through the operation terminal 50*b* is stored, and specifies the take-out port 2*b* associated with the operation terminal 50*b*. The control unit 20 controls the transport unit 10 to extract the item from the specified storage unit, and transport the item to the take-out port 2*b*. The control unit 20 displays information indicating that the item can be taken out from the take-out port 2*b*, on the display unit of the operation terminal 50*b* to notify the customer 301 of this fact. Upon checking the information on the display, the customer 301 takes out the item from the take-out port 2*b* to complete the transaction.

A semi-self-transaction, in which the clerk 200 serving a customer performs an item designating operation and an item price payment process, and the customer takes out the item from the take-out port 2, may also be performed. In this case, the clerk 200 performs an operation of designating an item that the customer purchases and a payment for the price of the item by using the operation terminal 50*a* and the payment apparatus 60*a*. The clerk 200 operates the operation terminal 50*a* to perform an operation of designating the take-out port 2*b* as a destination of the item. The control unit 20 of the item take-out apparatus 1 controls the transport unit 10 to transport the item to the take-out port 2*b*, on the condition that the payment process has been completed in the payment apparatus 60*a*. The customer takes out the item from the take-out port 2*b* to complete the transaction.

A semi-self-transaction, in which the clerk 200 serving a customer performs an item designating operation, and the customer performs an item price payment process and takes out the item from the take-out port 2, may also be performed. In this case, the clerk 200 operates the operation terminal 50*a* to designate an item that the customer purchases. The clerk 200 performs a predetermined operation by using the operation terminal 50*a*, whereby information indicating the price of the item is inputted to the payment apparatus 60*b*, and the take-out port 2*b* is designated as a destination of the item. The customer performs a payment process by using the payment apparatus 60*b* to pay for the item. The control unit 20 of the item take-out apparatus 1 controls the transport unit 10 to transport the item to the take-out port 2*b*, on the condition that the payment process has been completed in the payment apparatus 60*b*. The customer takes out the item from the take-out port 2*b* to complete the transaction.

A semi-self-transaction, in which a customer performs an item designating operation by himself/herself, and the clerk 200 performs an item price payment process and passes the item to the customer, may also be performed. In this case, the customer designates an item by operating the operation terminal 50*b*. When the customer performs a predetermined operation by using the operation terminal 50*b*, information indicating the designated item is inputted to the operation terminal 50*a*, and the take-out port 2*a* is designated as a destination of the item. The clerk 200 performs an item price payment process for the item by using the payment apparatus 60*a* based on the information received in the operation terminal 50*a*. The control unit 20 of the item take-out apparatus 1 controls the transport unit 10 to transport the item to the take-out port 2*a*, on the condition that the payment process has been completed in the payment apparatus 60*a*. The clerk 200 take outs the item from the take-out port 2*a* and passes the item to the customer to complete the transaction.

Figure 5:
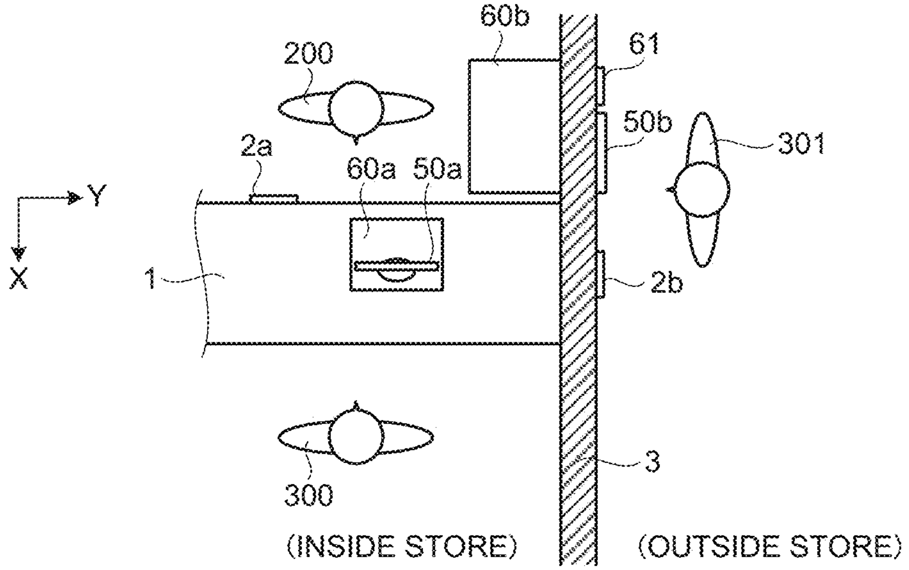
FIG. 5 is a schematic diagram illustrating an example of the item take-out apparatus having take-out ports inside and outside a store.

FIG. 5 is a schematic diagram illustrating an example of the item take-out apparatus 1 having take-out ports 2 inside and outside a store. In FIG. 5, the apparatuses are viewed from above. For example, the item take-out apparatus 1 is installed in the store near an exterior wall 3 of the store, and the take-out port 2*b* is disposed in the exterior wall 3 so that a customer can take out an item from outside the store. The payment apparatus 60*b* is installed in the store near the exterior wall 3 of the store, and the inlet/outlet 61 is disposed on the exterior wall 3 so that the customer can deposit and receive cash from outside the store. The operation terminal 50*b* including the operation unit and the display unit is fixed to the exterior wall of the store so that the customer can operate it from outside the store.

The clerk 200 can serve and deal with the customer 300 inside the store as described in FIG. 4. Moreover, the clerk 200 can deal with the customer 301 outside the store. In this case, the semi-self-transaction, in which at least one of designation of an item, payment for the item price, and reception of the item is performed by the customer 301 outside the store, is performed in the same manner as described in FIG. 4. Also, for example, the customer 301 outside the store can perform the self-transaction in the same manner as described in FIG. 4, in which the customer 301 designates the item by using the operation terminal 50*b*, pays for the item by using the payment apparatus 60*b* and receives the item from the take-out port 2*b*. This allows the customer 301 to purchase the item even during outside business hours of the store.

Figure 6:
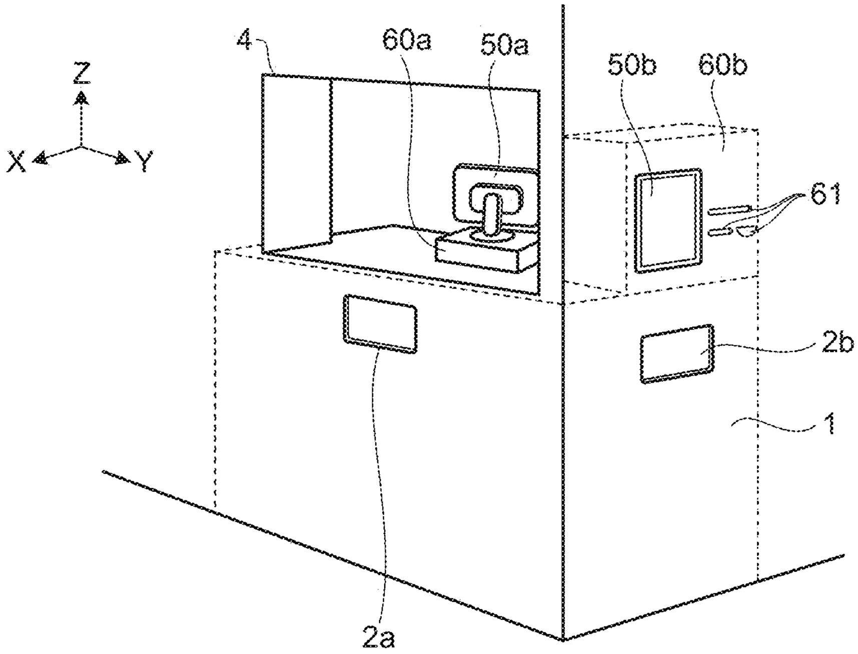
FIG. 6 is a schematic diagram illustrating an example of the item take-out apparatus having take-out ports outside a store.

FIG. 6 is a schematic diagram illustrating an example of the item take-out apparatus 1 having take-out ports 2 outside a store. The item take-out apparatus 1 is placed in the store near an exterior wall of the store, and a plurality of take-out ports 2 (2*a*, 2*b*) are disposed in exterior walls so that a customer can take out an item from outside the store. The take-out ports 2 may be respectively disposed in different exterior walls of the store as shown in FIG. 6, or a plurality of take-out ports 2 may be disposed in the same exterior wall. The operation terminal 50*b* and the payment apparatus 60*b* are installed so that the customer can perform the payment process and receive the item from outside the store in the same manner as in the case of FIG. 5.

A window 4 is formed in the wall of the store where the take-out port 2*a* is disposed. Using the window 4, the clerk can serve the customer outside the store while being inside the store. For example, the clerk performs the semi-self-transaction described in FIG. 4 in which the clerk designates an item by using the operation terminal 50*a* and handles the payment for the item by using the payment apparatus 60*a*, and the customer receives the item from the take-out port 2*a* on the surface of the exterior wall of the store. For another example, the customer outside the store performs the self-transaction in the same manner as described in FIG. 4, in which the customer designates an item by using the operation terminal 50*b*, performs the payment for the item by using the payment apparatus 60*b* and receives the item from the take-out port 2*b*.

The transaction methods described with reference to FIG. 4 to FIG. 6 are examples, and the transaction methods using the item take-out apparatus 1 are not limited thereto. For example, only part of the above transaction methods may be performed by using the item take-out apparatus 1. For another example, a plurality of pairs of the operation terminal 50*a* and the payment apparatus 60*a* may be disposed so that a plurality of clerks can simultaneously serve customers. Likewise, a plurality of pairs of the operation terminal 50*b* and the payment apparatus 60*b* may be provided so that a plurality of customers can simultaneously perform self-transactions. Even in these cases, transactions may be performed by using the operation terminals 50 and the payment apparatuses 60 as described above. Three or more take-out ports 2 may be disposed on the apparatus. For example, the kinds of items may be associated with the take-out ports 2 in the take-out information stored in the memory 40, and the item take-out apparatus 1 may transport items to different take-out ports 2 based on the kinds of the items. For example, the item take-out apparatus 1 may be composed of a combination of all or some of the components shown in FIGS. 4 to 6.

Figure 7:
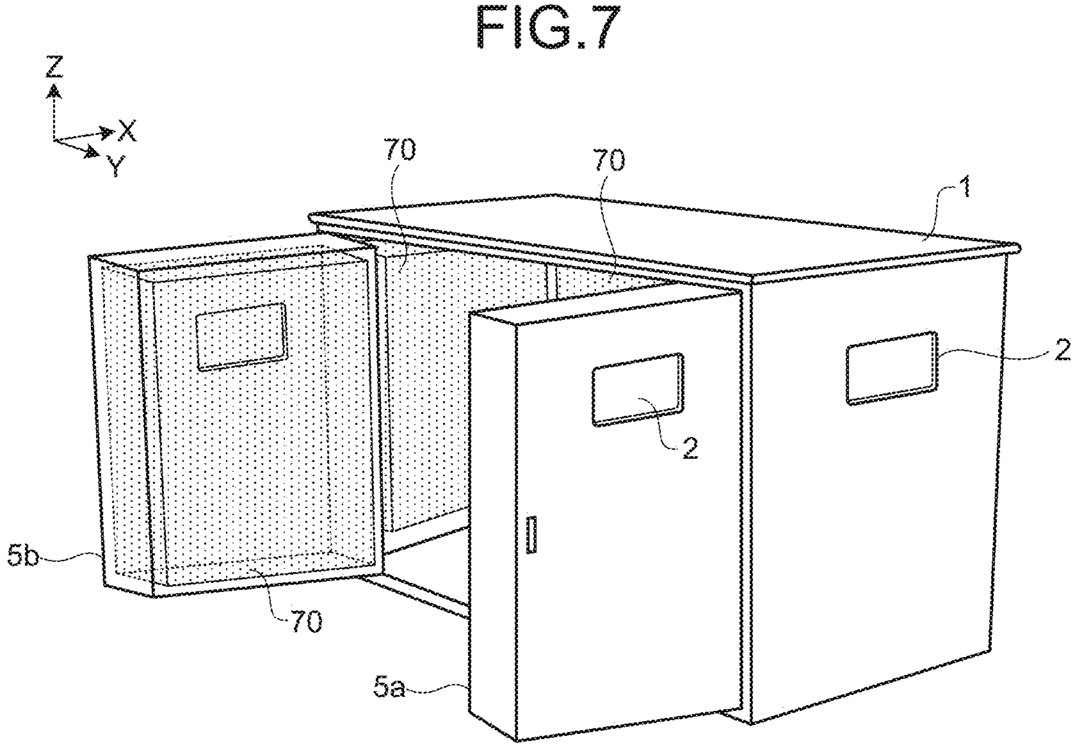
FIG. 7 illustrates storage units of the item take-out apparatus.

Next, storage of items in the item take-out apparatus 1 will be described. FIG. 7 illustrates storage units 70 of the item take-out apparatus 1. As shown in FIG. 7, one of the surfaces of the item take-out apparatus 1 is openable so that items can be stored in the storage units 70 disposed inside the apparatus.

FIG. 7 shows an example in which the item take-out apparatus 1 has double doors 5 (5*a*, 5*b*), separated roughly at the center, in a side surface of the apparatus 1 to be on the clerk side when the apparatus is installed on a counter of the store. When the doors 5 are pivoted and opened outwards, the inside of the apparatus is opened, so that the clerk can store items in the storage units 70.

In the example shown in FIG. 7, the storage units 70 are disposed on the inner sides of the double doors 5. The storage units 70 are also disposed on the opposed left and right side surfaces as viewed from the clerk who opened the doors 5, and the back surface, inside the apparatus. That is, the storage units 70 are disposed on all the four side surfaces inside the apparatus. However, the side surfaces on which the storage units 70 are to be disposed are not particularly limited. The storage units 70 may be disposed on some of the four side surfaces. The storage units 70 may also be disposed on at least one of the upper surface and the lower surface inside the apparatus.

For example, the storage units 70 are arranged in a plurality of tiers in the up-down direction (Z-axis direction), so that a plurality of items can be stored in each tier. FIGS.

8A and 8B are schematic diagrams illustrating multi-tier storage and transport of items stored in the multi-tier storage.

Figure 8A:
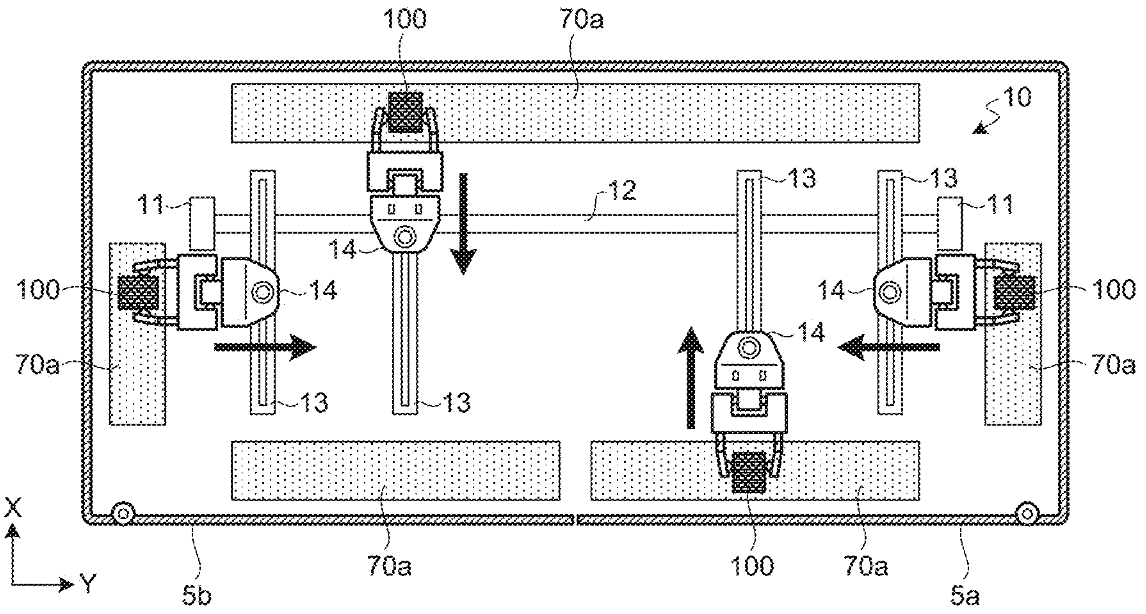
FIGS. 8A and 8B are schematic diagrams illustrating multi-tier storage and transport of items.
Figure 8B:
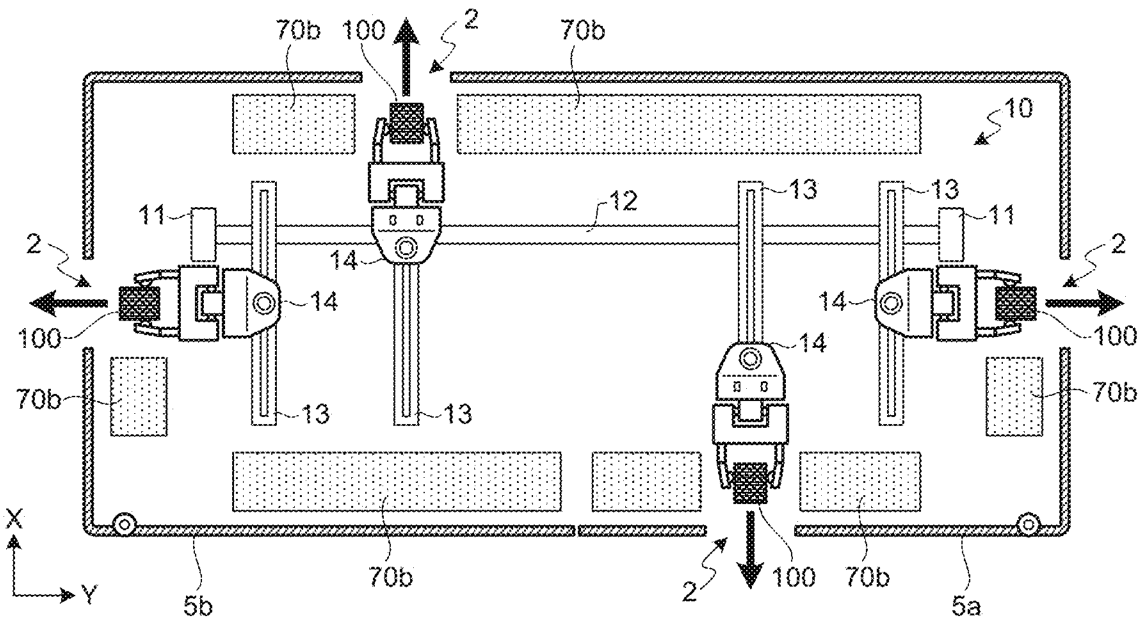

As shown in FIGS. 8A and 8B, a transport unit 10 is disposed inside the item take-out apparatus 1. The transport unit 10 includes a picker 14 and a plurality of rails 11 to 13. The picker 14 serves as a holding unit that extracts an item from a storage unit 70, and holds and transports the item. The picker 14 performs extraction of an item from a storage unit 70 (70*a*, 70*b*), and transport and placement of the extracted item to a take-out port 2. The picker 14 rotates at least in an XY plane. The picker moves forward and backward, leftward and rightward, and upward and downward, along the plurality of rails 11 to 13. The transport unit 10 includes the picker 14 that extracts an item from the storage unit 70 and holds the item, a rotation unit that rotates the picker 14, and a movement unit that moves the picker 14, which will be described in detail later.

As shown in FIG. 8A, in the tier having no take-out ports 2, the storage units 70*a* are disposed on the four side surfaces inside the apparatus. Meanwhile, as shown in FIG. 8B, in the tier having the take-out ports 2, the storage units 70*b* are disposed avoiding areas including the take-out ports 2.

The item take-out apparatus 1 moves the picker 14 by using the rails 11 to 13 to extract an item 100 from the storage unit 70*a* on each side surface, as shown in FIG. 8A. The item take-out apparatus 1 moves the picker 14 to transport an item 100 to the take-out port 2 in each side surface, as shown in FIG. 8B.

In FIGS. 8A and 8B, pickers 14 and rails 13 corresponding to each of the four side surfaces are disposed inside the apparatus. However, by moving and rotating one picker 14, the item take-out apparatus 1 may perform extraction of an item 100 from each storage unit 70, and placement of the item 100 on a take-out port 2.

Figure 9A:
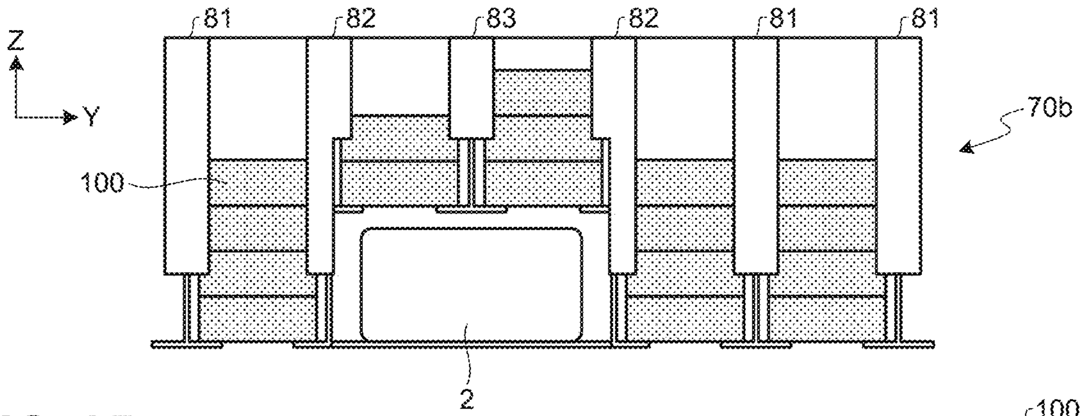
FIGS. 9A and 9B illustrate methods of storing items in a storage unit.
Figure 9B:
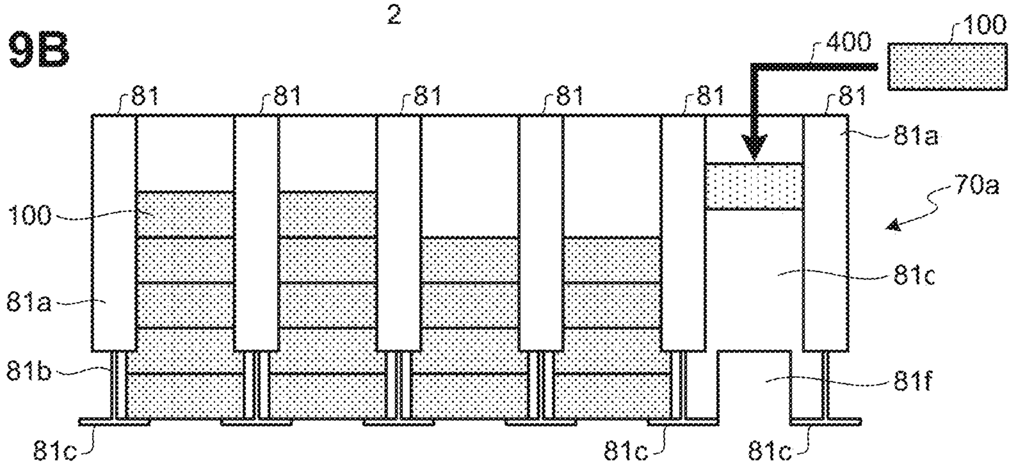

A multi-tier storage unit 70 is formed inside the apparatus by the storage units 70*a* in the tier having no take-out ports 2 shown in FIG. 8A and the storage units 70*b* in the tier having the take-out ports 2 shown in FIG. 8B. FIG. 9 illustrates a storage method of items 100 in the storage unit 70. The storage unit 70*a* shown in a lower part of FIG. 9 corresponds to FIG. 8A, and the storage unit 70*b* shown in an upper part of FIG. 9 corresponds to FIG. 8B. Coordinate axes in FIG. 9 and subsequent figures indicate that the figures show the storage units 70 on the back surface side that is the X-axis positive direction side. That is, the figures show the storage unit 70 on the back side of the apparatus as viewed from the clerk who opened the doors 5, among the storage units 70 shown in FIGS. 8A and 8B. However, even in the other storage units 70, storage, extraction, transport, and placement of items 100 are similarly performed.

As shown in FIG. 9, the storage unit 70 (70*a*, 70*b*) has a plurality of partition members 81 to 83. As shown in the lower part of FIG. 9, in the storage unit 70*a*, a plurality of items 100 are vertically stacked and stored between the adjacent partition members 81. Each partition member 81 includes a main body part 81*b* that separates the items 100. A support member 81*c* is disposed at the bottom of the main body part 81*b*. The support member 81*c* supports from below the items 100 stacked between adjacent main body parts 81*b*. A lowermost item 100 among the plurality of vertically stacked items 100 is supported by the support members 81*c* at portions of a lower surface thereof from both outer sides in the Y-axis direction. A center portion of the lower surface of the lowermost item 100 is exposed over the entire surface in the X-axis direction between the support members 81*c* on both outer sides (see FIG. 10A).

A holding member 81*a* is disposed on the front surface of the main body part 81*b* of each partition member 81. The holding member 81*a* holds the second item 100 from the bottom and other items 100 stacked on the second item 100, among the plurality of stacked items 100. The second item 100 and items 100 on and above the second item 100 are held from the front (from the X-axis negative direction side corresponding to the front side in FIG. 9). The holding member 81*a* holds portions of the front surface (the side surface in the X-axis negative direction) of each item 100 from both outer sides in the Y-axis direction, so that a center portion of the front surface of each item 100 is exposed between the holding members 81*a* on both outer sides. The entire front surface of the lowermost item 100 is exposed so that the picker 14 can extract it forward.

Each item 100 is stored in the storage unit 70 such that information indicating the kind of the item 100, such as the item name, printed on the front side surface, is exposed between the holding members 81*a*. This allows the clerk to easily check the kinds of the items 100 stored in the storage unit 70. For example, the item take-out apparatus 1 may include a camera mounted on the picker 14, and may capture an image of the items 100 in the storage unit 70 with the camera while moving the picker 14. When specifying a position of the item designated by the user based on the storage information in the memory 40 and extracting the item from the storage unit 70, the item take-out apparatus 1 may analyze the image captured by the camera to confirm that the item being extracted from the storage unit 70 is the item designated by the user. In addition, by capturing an image of the items 100 stored in the storage unit 70 and analyzing the captured image, the item take-out apparatus 1 may manage the kinds and the number of the items 100 being stored in the storage unit 70. That is, based on the image taken by the camera mounted on the picker 14, the item take-out apparatus 1 can specify the kinds and the number of the items 100 stored in the storage unit 70, confirm an item 100 to be taken out from the apparatus, and manage the inventory of the items 100.

As shown in FIG. 9, in the storage unit 70*b* of the tier including the take-out port 2, partition members 82, 83 different from the partition members 81 are used to avoid the take-out port 2, but the function of the partition members 82, 83 is the same as that of the partition members 81. Specifically, the partition members 82, 83 also support portions of the lower surface of the lowermost item 100 among the plurality of stacked items 100, and also hold portions of the front surfaces of the items 100 from the uppermost one to the second one from the bottom.

An item 100 is stored in the storage unit 70*a* through a gap between an upper end of the storage unit 70*a* and a lower end of the upper-tier storage unit 70*b* disposed above the storage unit 70*a*, as indicated by an arrow 400 in FIG. 9. Also, in a storage unit 70 in another tier, an item 100 is stored through a gap between this storage unit 70 and an upper-tier storage unit 70.

The storage unit 70 has, at an upper surface thereof, a storage port for storing an item 100 from above. Also, the storage unit 70 has, at a lower end thereof, an extraction port for extracting the lowermost item 100 laterally (in the X-axis negative direction corresponding to the front side in FIG. 9). In the storage unit 70, a plurality of items 100 stored from the storage port are stacked in the up-down direction. In the storage unit 70, the items 100 are stored such that only the lowermost item 100 among the plurality of items 100 can be extracted from the extraction port.

As shown in the lower right part of FIG. 9, a back member 81*d* connecting adjacent partition members 81 is disposed on the back surface side (X-axis positive direction side) of the items 100 stacked in the storage unit 70. In a lower part of the back member 81*d*, a cutout part 81*f* is formed by cutting a portion of the back member 81*d* from the bottom surface side. For example, the cutout part 81*f* is formed to have a height being a dimension from the lower surface of the support member 81*c* to the lower end of the holding member 81*a*. For example, the cutout part 81*f* is formed to have a width being a dimension of a gap between the support members 81*c*. At least a portion of the back surface of each item 100 stored in the storage unit 70 is held by the back member 81*d* so as not to fall to the back side.

Figure 10A:
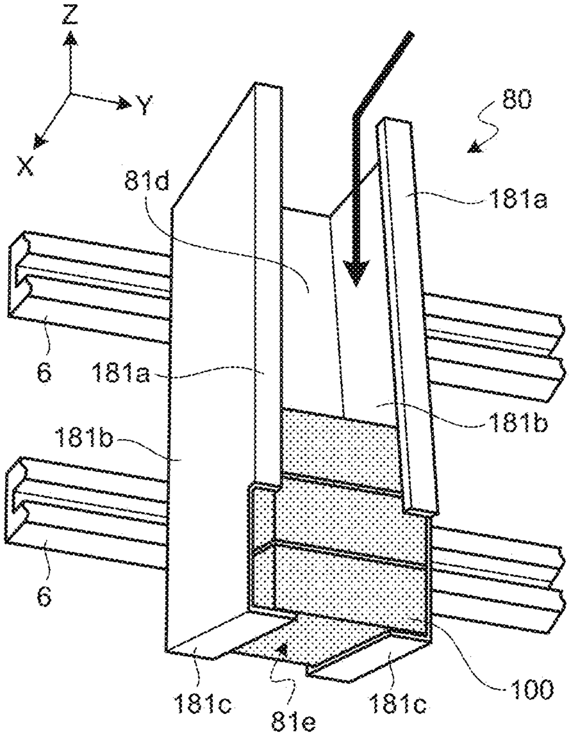
FIGS. 10A and 10B show an example of a storage container.
Figure 10B:
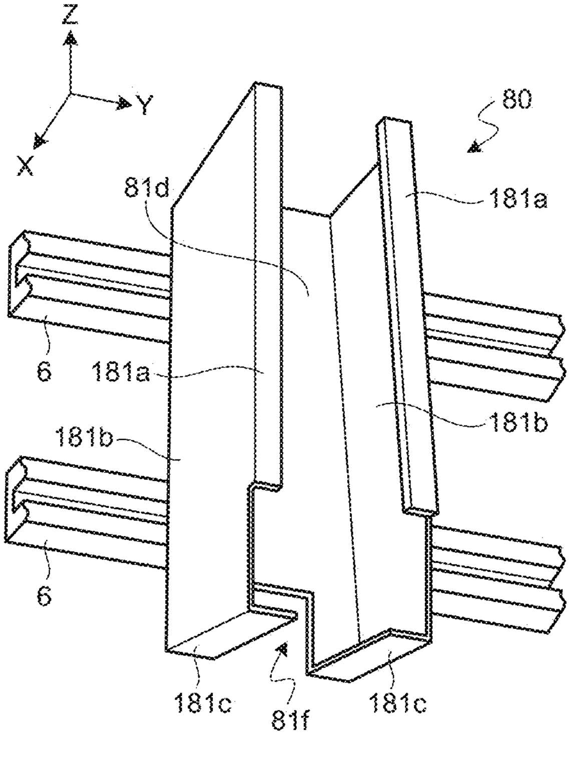

The storage unit 70 in each tier shown in FIG. 9 is realized by arranging a plurality of storage containers 80 in the Y-axis direction, for example. FIGS. 10A and 10B show an example of a storage container 80. FIG. 10A shows the storage container 80 containing items 100, and FIG. 10B shows the storage container 80 in the empty state, i.e., containing no items 100.

The storage container 80 is used while being fixed to a plurality of members 6 that are fixed to the inner wall of the housing and extend inside the item take-out apparatus 1. By arranging two adjacent storage containers 80 in close contact with each other, two holding members 181*a* shown in FIGS. 10A and 10B form a holding member 81*a* shown in FIG. 9. Likewise, the side plates 181*b* of the two closely contacting storage containers 80 form a main body part 81*b* shown in FIG. 9, and the support members 181*c* of the two closely contacting storage containers 80 form a support member 81*c* shown in FIG. 9.

As shown in FIG. 10A, among the items 100 stored in the storage container 80, an item 100 stored at the bottom is exposed, from the storage container 80, at the entire front surface (the side surface in the X-axis negative direction) and at front-side portions of the left and right side surfaces (in the Y axis direction). In addition, the lowermost item 100 is exposed at a center portion, in the width direction (Y axis direction), of the lower surface, over the entire lower surface in the X-axis direction, from a gap 81*e* between the support members 181*c* on both outer sides in the left-right direction. Moreover, on the back surface side of the lowermost item 100, the cutout part 81*f* is formed at the lower end of the back member 81*d* as shown in FIG. 10B. Therefore, this item 100 is also exposed at a center portion, in the width direction, of the back surface from the cutout part 81*f* of the back member 81*d*.

Thus, the item 100 stored at the bottom of the storage container 80, i.e., the lowermost item 100 in the storage unit 70, can be extracted forward from the storage unit 70 with a robot hand that grasps the exposed front-side portions (the X-axis negative direction side) of the left and right side surfaces. Alternatively, a hook-shaped member may be inserted to the back surface side (X-axis positive direction) of the lowermost item 100. Then, the hook-shaped member is caught on the back surface of the item 100 and pulled forward, whereby the item 100 can be extracted forward from the storage unit 70. The transport unit 10 extracts the item 100 from the storage container 80, i.e., the storage unit 70, as described above, which will be described in detail later.

The configuration of the storage unit 70 shown in FIG. 9 is an example, and the storage unit 70 may not necessarily be configured by closely connecting the storage containers 80 shown in FIGS. 10A and 10B. The storage containers 80 may be disposed away from each other in the Y axis direction. The storage method for items 100 is not limited to the method of stacking the items 100 in the up-down direction in the storage unit 70. For example, the storage container 80 shown in FIGS. 10A and 10B may be rotated 90° around the X-axis direction, and the items 100 in the storage unit 70 may be stored while being arranged in the lateral direction (Y-axis direction).

Figure 11A:
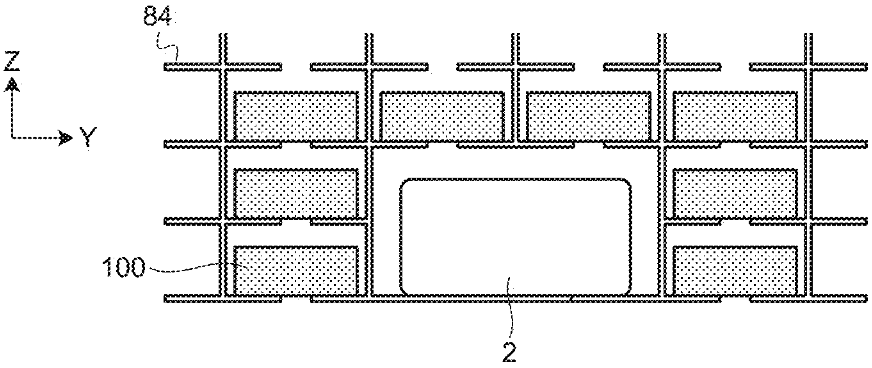
FIGS. 11A and 11B show other examples of the item storage method.
Figure 11B:
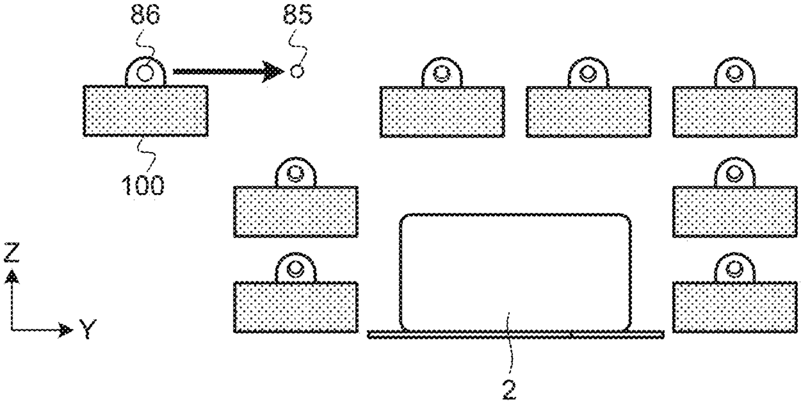

FIGS. 11A and 11B show other examples of the storage method for items 100. As shown in FIG. 11A, the storage unit 70 may be partitioned into a plurality of storage spaces by partition members 84, and an item 100 may be stored in each storage space. As shown in FIG. 11B, the storage unit 70 may have a plurality of arms 85 for hanging items 100, and a plurality of items 100 may be stored while being hung and arranged in the front-rear direction (X-axis direction) by inserting the arms 85 through hanging holes of the items 100.

Figure 12:
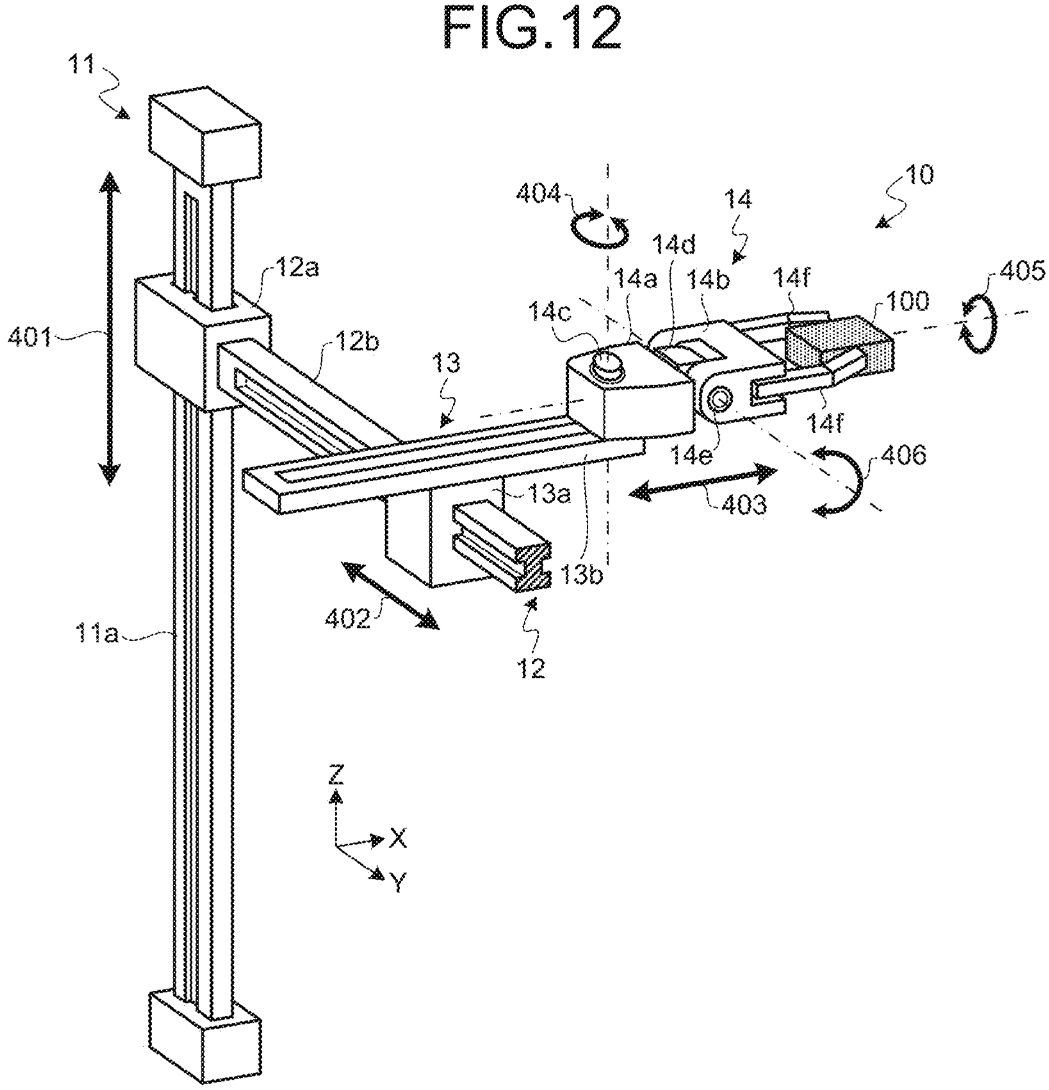
FIG. 12 shows an example of a transport unit.

Next, transport of items 100 in the item take-out apparatus 1 will be described. FIG. 12 shows an example of the transport unit 10. The transport unit 10 includes a plurality of rails 11 to 13, and a picker 14. The transport unit 10 includes a plurality of driving units, and the control unit 20 controls driving of each driving unit to realize an operation of the transport unit 10 described below.

The first rail 11 includes a rail part 11*a* extending in the up-down direction (Z-axis direction). As shown in FIG. 8, the first rail 11 is fixed to the inside of the item take-out apparatus 1.

The second rail 12 includes a main body part 12*a*, and a rail part 12*b* fixed to a side surface of the main body part 12*a* extends in the left-right direction (Y-axis direction). The rail part 11*a* of the first rail 11 is inserted through the main body part 12*a*. The second rail 12 is movable in the up-down direction along the rail part 11*a* as indicated by an arrow 401 in FIG. 12.

The third rail 13 includes a main body part 13*a*, and a rail part 13*b* fixed to an upper surface of the main body part 13*a* extends in the front-rear direction (X-axis direction). The rail part 12*b* of the second rail 12 is inserted through the main body part 13*a*. The third rail 13 is movable in the left-right direction (Y-axis direction) along the rail part 12*b* as indicated by an arrow 402.

The picker 14 includes a base part 14*a*, a main body part 14*b*, and a plurality of finger parts 14*f*. The base part 14*a* mounted on the rail part 13*b* of the third rail 13 is movable in the front-rear direction (X-axis direction) along the rail part 13*b* as indicated by an arrow 403. The base part 14*a* is movable in the X-axis negative direction and in the X-axis positive direction with respect to the main body part 13*a* of the third rail 13. The base part 14*a* is rotatable around a shaft 14*c* as indicated by an arrow 404.

A connection part 14*d* rotatable as indicated by an arrow 405 is mounted on the base part 14*a*, and the connection part 14*d* is connected to the main body part 14*b* by a shaft 14*e*. This allows the main body part 14*b* to rotate with respect to the base part 14*a* as indicated by the arrow 405. The main body part 14*b* is pivotable around the shaft 14*e* as indicated by an arrow 406. The main body part 14*b* has a plurality of finger parts 14*f* which grasp and release an item 100.

Figure 13:
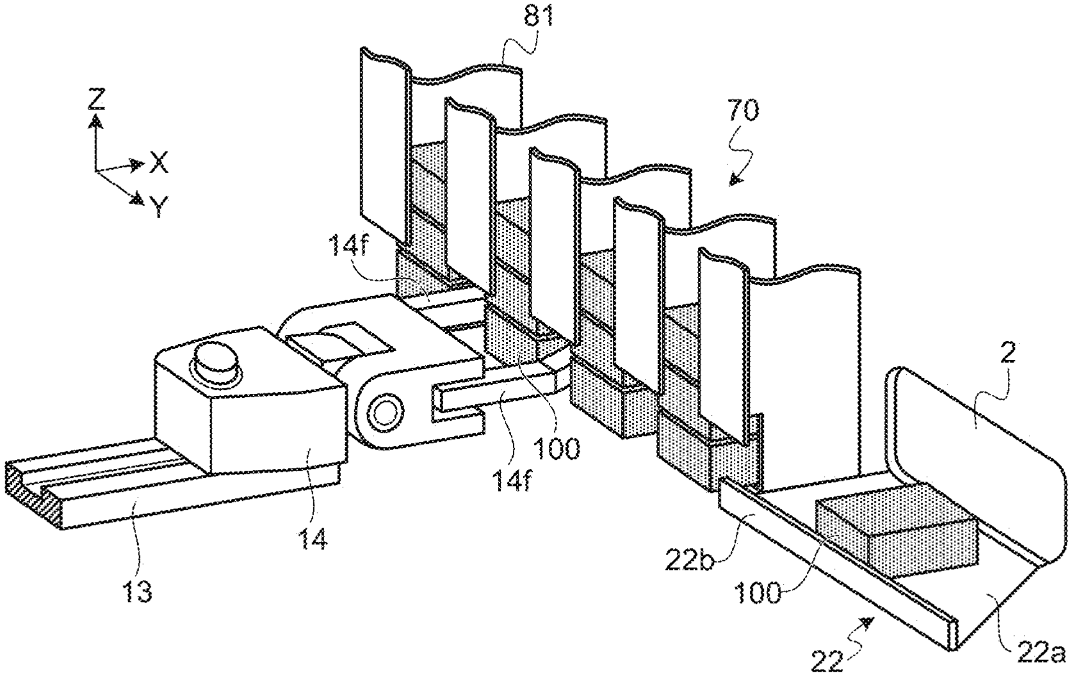
FIG. 13 illustrates a method of moving an item by a picker.

FIG. 13 illustrates a method of moving an item 100 by the picker 14. As described in FIGS. 10A and 10B, the lowermost item 100 stored in the storage unit 70 is exposed at the front-side portions of the left and right side surfaces, as viewed from the picker 14. The transport unit 10 can extract the item 100 from the storage unit 70 by grasping the exposed portions from the left and right outer sides with the finger parts 14*f* of the picker 14, and pulling the item 100 forward.

The transport unit 10 can move the picker 14 forward and backward, leftward and rightward, and upward and downward inside the item take-out apparatus 1. The transport unit 10 moves the picker 14 grasping the item 100 to a take-out port 2, and causes the picker 14 to release the item 100. Thus, the user can take out the item 100 from the take-out port 2.

As shown in FIG. 13, a placement part 22 (22*a*, 22*b*) of the take-out port 2 may be provided with a guard 22*b* that prevents an item 100 from falling from a placement surface 22*a* into inside the apparatus. The method of placing an item 100 on the placement surface 22*a* is not limited to the method in which the picker 14 enters a space above the placement surface 22*a*, and releases the item 100 to place it on the placement surface 22*a*. A groove that allows the finger parts 14*f* of the picker 14 to pass may be formed in the placement surface 22*a*. The main body part 14*b* of the picker 14 may enter a space beneath the placement surface 22*a* such that the finger parts 14*f* pass the groove, and place the item 100 on the placement surface 22*a*.

Figure 14A:
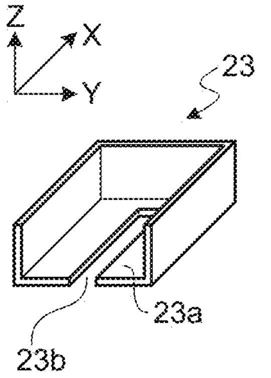
FIGS. 14A to 14C illustrate a method of placing an item on a placement part of a take-out port.
Figure 14B:
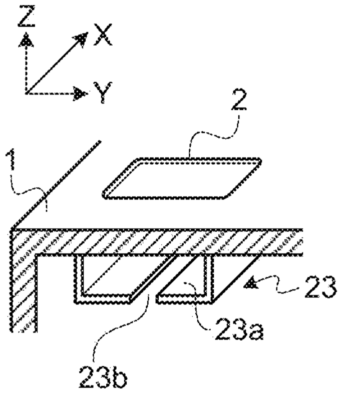
Figure 14C:
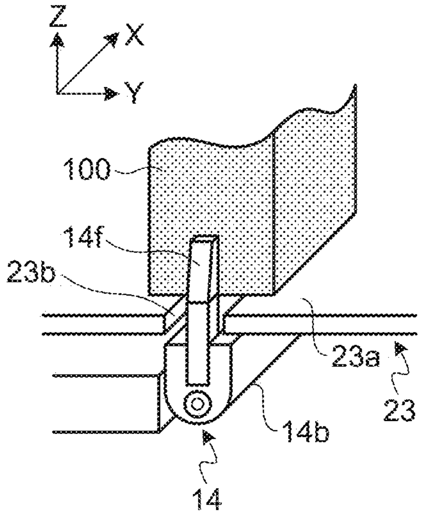

FIGS. 14A to 14C illustrate a method of placing an item 100 on a placement part 23 of a take-out port 2. For example, as shown in FIG. 14A, a box-like placement part 23 has an upper surface and one side surface that are open. At a bottom surface, which is a placement surface 23*a*, of the placement part 23, a groove 23*b* is formed to allow the finger parts 14*f* of the picker 14 to pass. For example, as shown in FIG. 14B, the placement part 23 is fixed to the upper surface inside the housing of the item take-out apparatus 1. A take-out port 2 is disposed facing the opened upper surface of the placement part 23, and an item 100 can be taken out from the placement part 23 with the shutter of the take-out port 2 being manually or automatically opened. As shown in FIG. 14C, the transport unit 10 causes the main body part 14*b* of the picker 14 to enter a space beneath the placement part 23 such that the finger parts 14*f* grasping the item 100 are turned upward and pass the groove 23*b*. After the item 100 grasped by the finger parts 14*f* has been moved onto the placement surface 23*a*, the finger parts 14*f* releases the item 100 and the transport unit 10 moves the finger parts 14*f* downward and outward from the placement part 23 to complete placement of the item 100 on the placement surface 23*a*.

Figure 15:
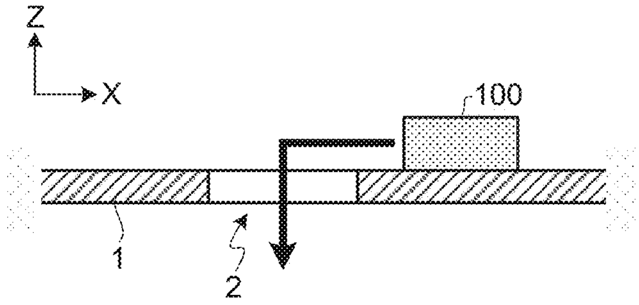
FIG. 15 shows an example of a take-out port disposed in a lower surface inside a housing of the item take-out apparatus.

FIG. 15 shows an example of a take-out port 2 disposed in the lower surface inside the housing of the item take-out apparatus 1. When the take-out port 2 is disposed in the lower surface of the apparatus, the transport unit 10 places an item 100 on the lower surface inside the housing as shown in FIG. 15. The user inserts a hand into the item take-out apparatus 1 and takes out the item 100 via the take-out port 2 as shown by an arrow in FIG. 15.

Figure 16:
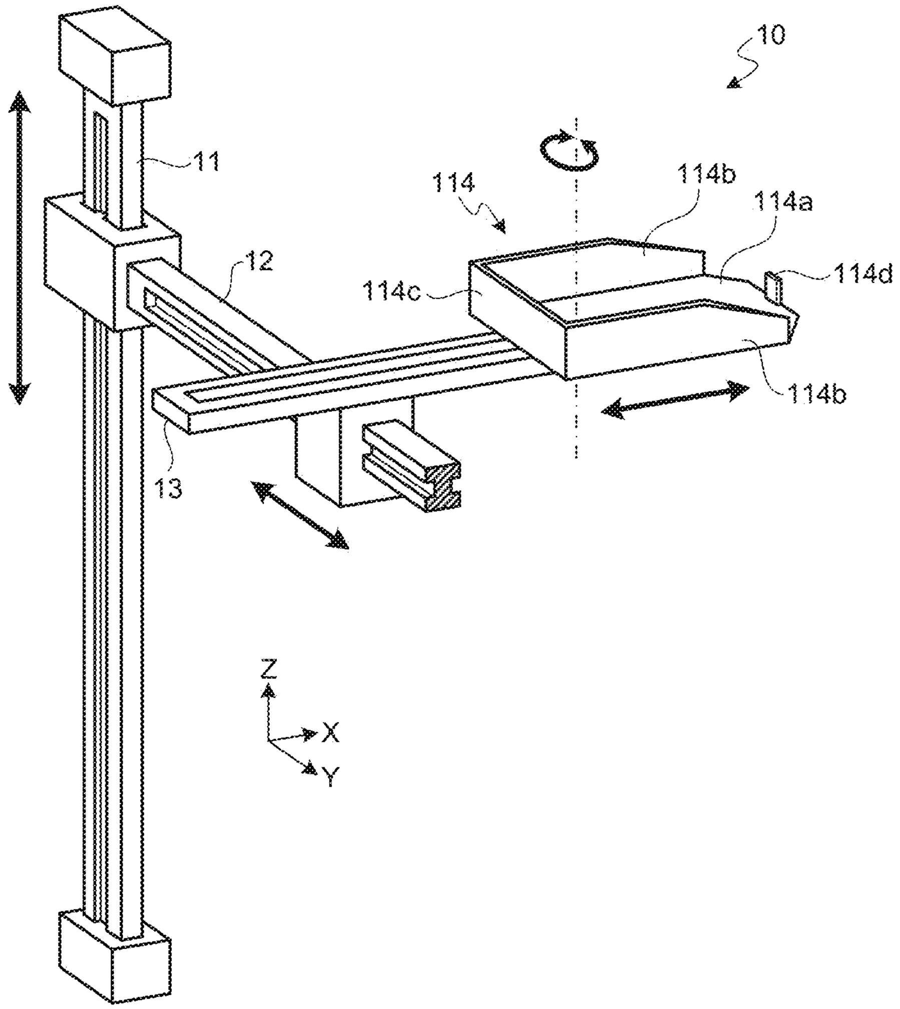
FIG. 16 shows another example of the picker.

The transport unit 10 is not limited to one having the robot hand type picker 14 shown in FIG. 12. FIG. 16 shows another example of a picker 114. As shown in FIG. 16, the transport unit 10 may have a tray-shaped picker 114. The transport unit 10 can move the picker 114 forward and backward, leftward and rightward, and upward and downward inside the item take-out apparatus 1 by using the plurality of rails 11 to 13 described in FIG. 12. The transport unit 10 can rotate the picker 14 with respect to the third rail 13.

The picker 114 has a tray shape composed of thin plates that are a bottom plate 114*a*, a back plate 114*c*, and two side plates 114*b*. An upper surface and one side surface of the picker 114 are open. The picker 114 has, at the open side surface, a hook 114*d* projecting from an upper surface of the bottom plate 114*a*. Each of the two side plates 114*b* has the same height as the back plate 114*c* on the back plate 114*c* side, but a part thereof on the hook 114*d* side is sloped such that the height is reduced as approaching the hook 114*d*. When the picker 114 moves with an item 100 placed on the bottom plate 114*a*, the back plate 114*c*, the side plates 114*b*, and the hook 114*d* prevent the item 100 from falling from the picker 114.

Figure 17:
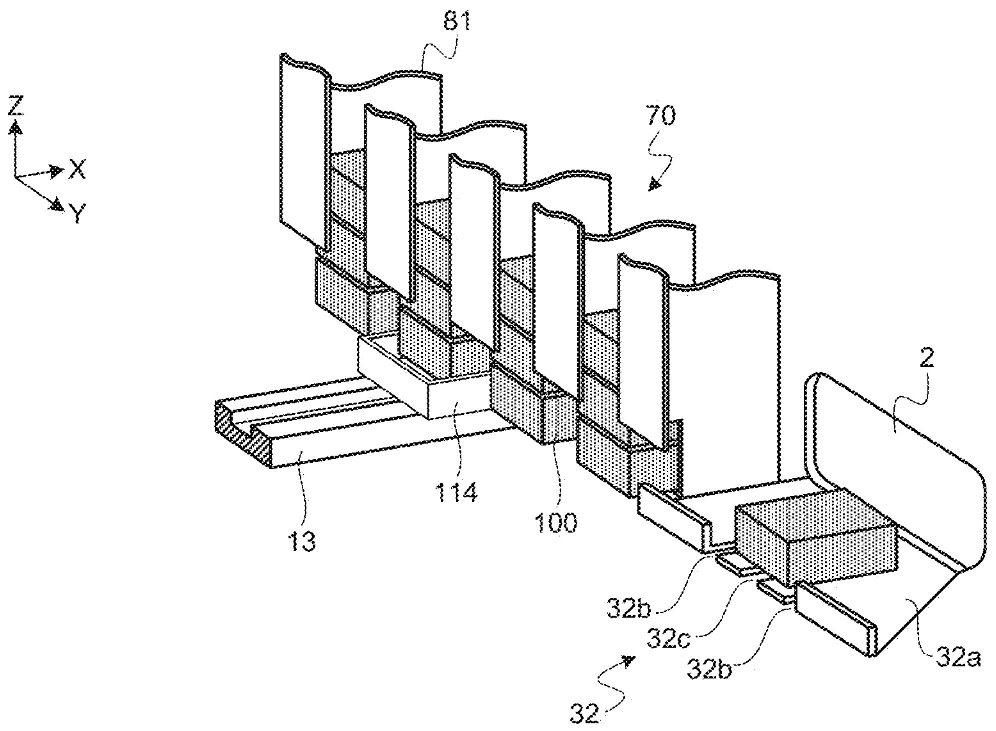
FIG. 17 illustrates a method of moving an item by the picker shown in FIG. 16.

FIG. 17 illustrates a method of moving an item 100 by the picker 114 shown in FIG. 16. As described in FIGS. 10A and 10B, the lowermost item 100 stored in the storage unit 70 is exposed at a portion of the bottom surface and a portion of the back surface. The transport unit 10 can extract the item 100 from the storage unit 70 by hanging the hook 114*d* of the picker 14 on the back surface of the item 100, and pulling the item 100 forward. The transport unit 10 can move the picker 14 forward and backward, leftward and rightward, and upward and downward inside the item take-out apparatus 1. At a placement part 32 (32*a* to 32*c*) of the take-out port 2 shown in FIG. 17, the transport unit 10 causes the bottom plate 114*a* of the picker 114 on which the item 100 is placed to enter a space beneath the placement part 32 such that the side plates 114*b* and the hook 114*d* pass grooves 32*b* and a groove 32*c*, thereby placing the item 100 on a placement surface 32*a*. The above method will be specifically described with reference to FIG. 18 to FIG. 21.

FIGS. 18A to 18D show the picker 114 that extracts an item 100*a* from a storage unit 70, as viewed from above. FIGS. 19A to 19D show the picker 114 that extracts the item 100*a* from the storage unit 70, as viewed from a side. FIGS. 19A to 19D FIG. 19D show the side views of the picker 114 shown in FIGS. 18A to 18D, respectively.

Figure 18A:
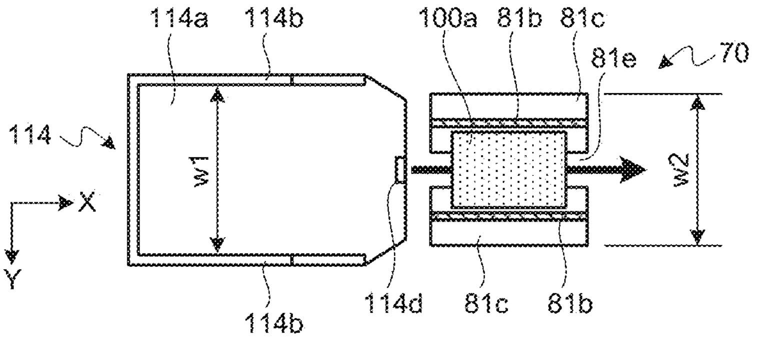
FIGS. 18A to 18D show the picker that extracts an item from a storage unit, as viewed from above.
Figure 18B:
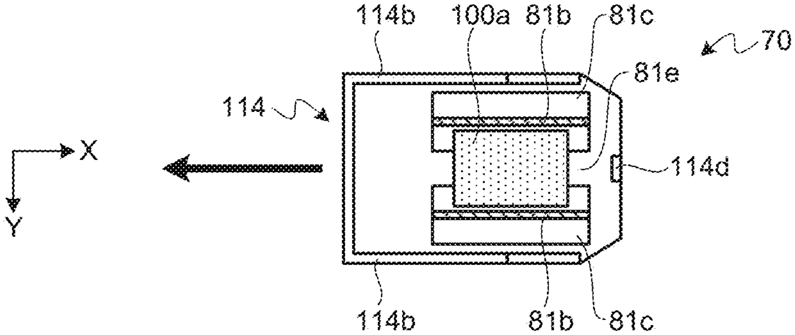
Figure 19A:
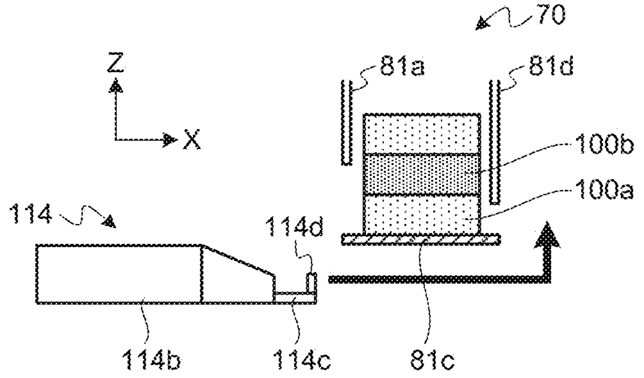
FIGS. 19A to 19D show the picker that extracts the item from the storage unit, as viewed from a side.
Figure 19B:
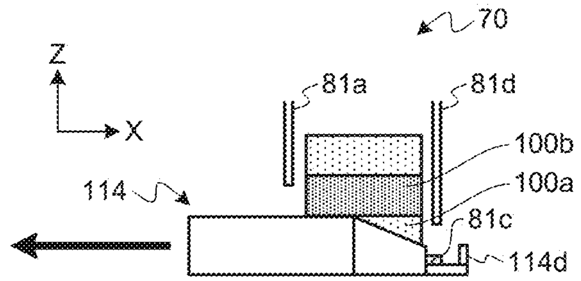

As shown in FIG. 18A, a dimension w1 between the side plates 114*b* of the picker 114 is greater than a dimension w2 between the outer sides of two adjacent support members 81*c* in the storage unit 70 (w1>w2). As shown in FIG. 18A and FIG. 19A, the picker 114 enters the storage unit 70 with the bottom plate 114*a* and the hook 114*d* being lower than the support members 81*c* of the storage unit 70, and moves upward. As shown in FIG. 18B and FIG. 19B, the picker 114 moves upward to a position where a part of the hook 114*d* exceeds the upper surfaces of the support members 81*c*, and then starts to move backward. With the two side plates 114*b* being outside the two adjacent support members 81*c*, the picker 114 moves backward such that the hook 114*d* passes the gap 81*e* between the support members 81*c*.

Figure 18C:
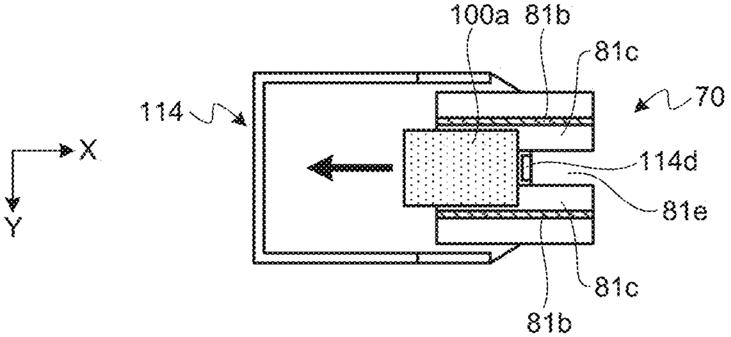
Figure 18D:
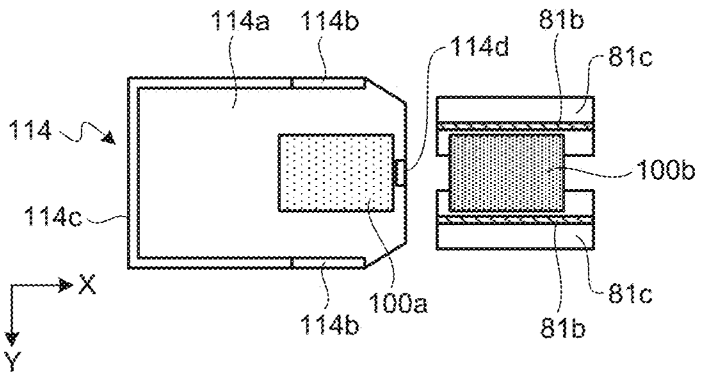
Figure 19C:
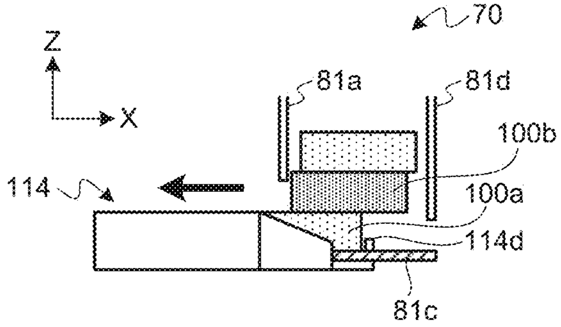
Figure 19D:
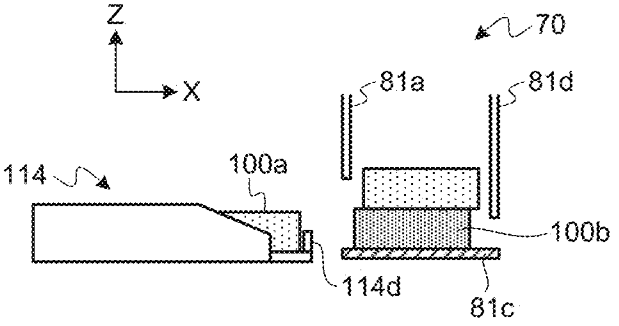

As shown in FIGS. 18C and FIG. 19C, among a plurality of items 100 (100*a* to 100*c*) stored in the storage unit 70, only the back surface of the lowermost item 100*a* comes into contact with the hook 114*d* of the picker 114 moving backward. With the backward movement of the picker 114, the lowermost item 100*a* moves, in the X-axis negative direction, between the main body parts 81*b* of the adjacent partition members 81, and is extracted from the storage unit 70. At this time, the holding member 81*a* of the storage unit 70 holds the other items 100*b*, 100*c* to prevent them from being extracted from the storage unit 70 together with the item 100*a* to be extracted. As a result, as shown in FIG. 18D and FIG. 19D, only one item 100*a* is extracted from the storage unit 70 and placed on the bottom plate 114*a* of the picker 114.

Figure 20A:
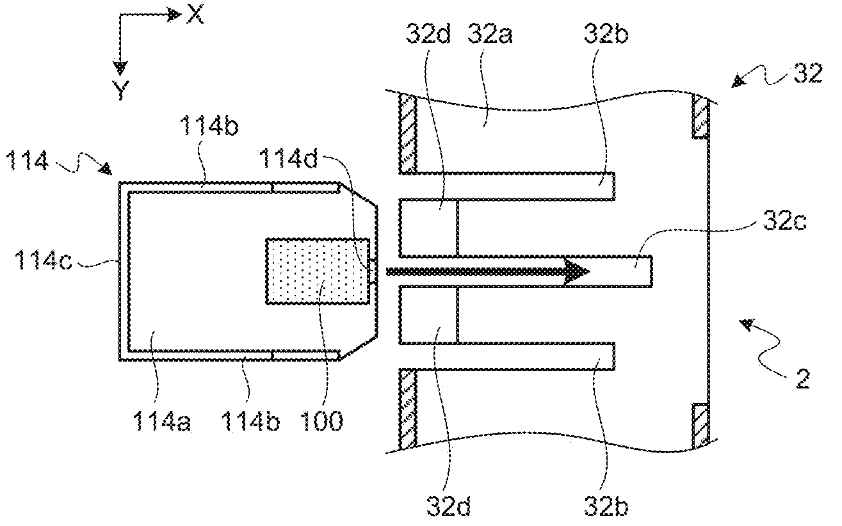
FIGS. 20A to 20C show the picker that places an item on a placement part of a take-out port, as viewed from above.
Figure 20B:
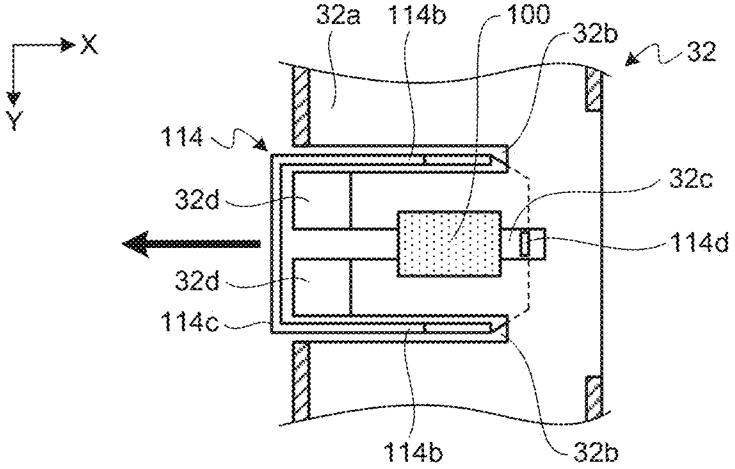
Figure 20C:
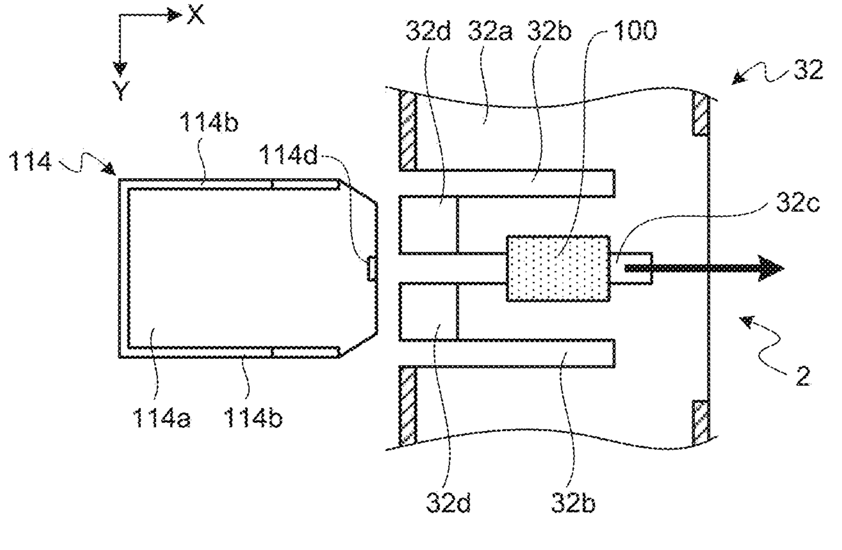
Figure 21A:
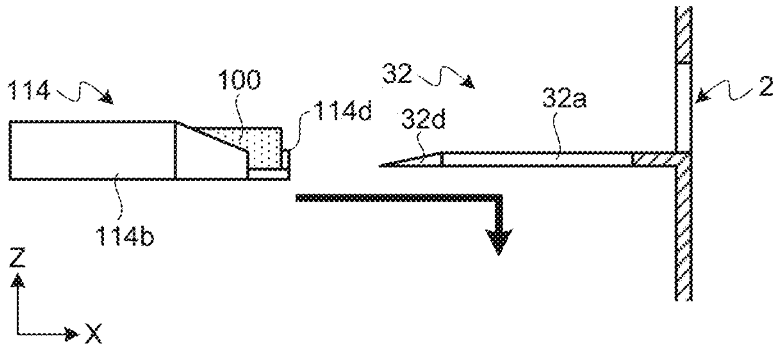
FIGS. 21A to 21C show the picker that places the item on the placement part of the take-out port, as viewed from a side.
Figure 21B:
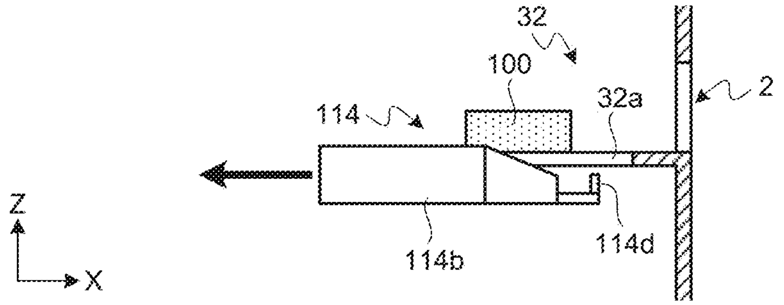
Figure 21C:
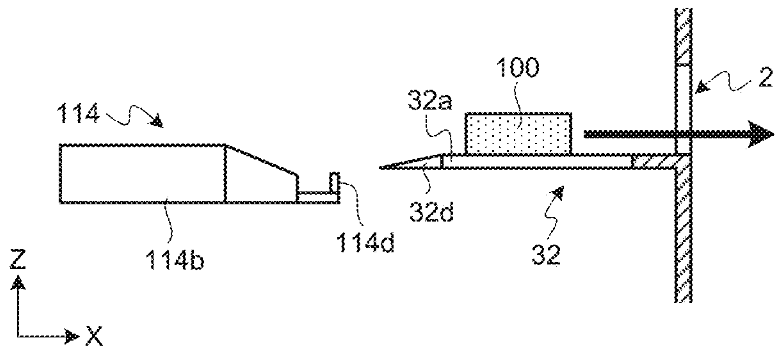

FIGS. 20A to 20C show the picker 114 that places an item 100 on the placement part 32 of the take-out port 2, as viewed from above. FIGS. 21A to 21C show the picker 114 that places the item 100 on the placement part 32 of the take-out port 2, as viewed from a side. FIGS. 21A to 21C show the side views of the picker 114 shown in FIGS. 20A to 20C, respectively. As shown in FIG. 20A, two grooves 32*b* corresponding to the two side plates 114*b* of the picker 114 and a groove 32*c* corresponding to the hook 114*d* are formed in the placement part 32.

With the bottom plate 114*a* being lower the placement part 32, the picker 114 enters the placement part 32 as indicated by arrows in FIG. 20A and FIG. 21A such that the side plates 114*b* pass the grooves 32*b* and the hook 114*d* passes the groove 32*c*, and thereafter, moves downward to a position where the hook 114*d* is beneath and outside the placement part 32.

As shown in FIG. 20B and FIG. 21B, the item 100 on the bottom plate 114*a* of the picker 114 is transferred onto the placement surface 32*a* when the picker 114 enters the placement part 32. In order to smoothly transfer the item 100 from the bottom plate 114*a* onto the placement surface 32*a* when the picker 114 enters the placement part 32, a slope area 32*d* whose thickness is reduced with distance from the take-out port 2 is preferably formed between the three grooves 32*b* and 32*c* of the placement part 32 as shown in FIG. 20A and FIG. 21A.

The picker 114, having transferred the item 100 onto the placement surface 32*a* and moved downward, moves backward to a position away from the placement part 32 as shown in FIG. 20C and FIG. 21C. The user can take out the item 100 from the take-out port 2 as indicated by arrows in FIG. 20C and FIG. 21C.

Figure 22:
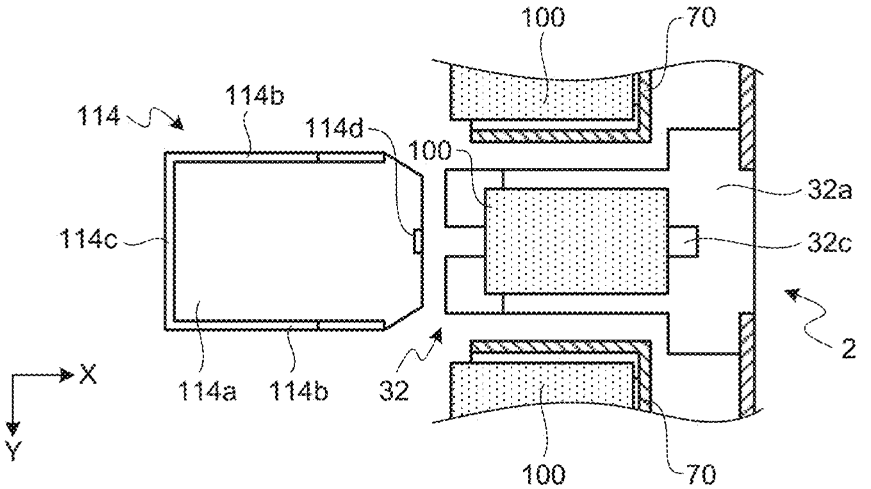
FIG. 22 shows another example of the placement part.

FIG. 17 and FIGS. 20A to 20C show the example in which the grooves 32*b* corresponding to the side plates 114*b* of the picker 114 are formed in the placement part 32, but the configuration of the placement part 32 is not limited thereto. FIG. 22 shows another example of the placement part 32. As shown in FIG. 22, only a groove 32*c* corresponding to the hook 114*d* of the picker 114 may be formed in the placement part 32, and each of the side plates 114*b* of the picker 114 may pass a gap between the placement part 32 and the storage unit 70 adjacent to the placement part 32.

In the present embodiment, the picker 14, 114 is moved by using the plurality of rails 11 to 13. However, the method of moving the picker 14, 114 is not particularly limited. For example, the picker 14, 114 may be disposed at a distal end of a robot arm having a plurality of joints, and moved by the robot arm. The robot arm is installed inside the item take-out apparatus 1 such that the picker 14, 114 reaches all the items 100 in the storage units 70 and all the take-out ports 2, whereby the item take-out apparatus 1 can perform the above-described operations.

In the present embodiment, the rectangular parallelepiped items 100 are schematically shown, but the shapes and the kinds of the items 100 are not particularly limited. For example, an item may be stored in a box-shaped case and the case may be treated similarly to the item 100, whereby various items can be taken out by using the item take-out apparatus 1.

In the present embodiment, various methods of taking out items 100 have been described. However, the item take-out apparatus 1 may not necessarily realize all the take-out methods, and may realize some of the take-out methods according to the usage method of the item take-out apparatus 1 in the store.

An item take-out apparatus according to the present disclosure is an apparatus from which a user takes out an item. The apparatus includes: a storage unit configured to store items therein; a plurality of take-out ports through which the user takes out an item from inside the item take-out apparatus; and a transport unit configured to extract an item from the storage unit and transport the item to any of the plurality of take-out ports. The transport unit may transport an item designated by the user to a take-out port, through which the user takes out the item, among the plurality of take-out ports. The user includes a clerk and a customer, for example.

In the above configuration, at least one take-out port may be disposed in each of a plurality of surfaces of a housing of the item take-out apparatus.

In the above configuration, at least one take-out port may be disposed in each of at least two surfaces out of four side surfaces, an upper surface and a lower surface that constitute a housing of the item take-out apparatus.

In the above configuration, at least one of the plurality of take-out ports may be disposed in an exterior wall of a store so that the user takes out the item from outside the store.

In the above configuration, the apparatus may further include an operation unit for the user to designate an item and/or a take-out port.

In the above configuration, the apparatus may further include a communication unit configured to receive information indicating the item and the take-out port designated by the user from an external apparatus including an operation unit for the user to designate an item and a take-out port.

In the above configuration, when an item and a take-out port have been designated by using the operation unit, the transport unit may transport the designated item to the designated take-out port.

In the above configuration, the apparatus may further include a memory that stores information indicating correspondence between kinds of the items and the plurality of take-out ports. When an item has been designated by using the operation unit, a take-out port corresponding to the item may be specified based on the information stored in the memory and the transport unit may transport the item to a take-out port corresponding to the item.

In the above configuration, the apparatus may further include: a plurality of operation units; and a memory that stores information indicating correspondence between the respective operation units and the plurality of take-out ports. When an item has been designated by using any one of the operation units, a take-out port corresponding to the operation unit is specified based on the information stored in the memory and the transport unit may transport the item to a take-out port corresponding to the operation unit.

In the above configuration, when an item for which purchase eligibility is required has been designated by using the operation unit, the transport unit may transport the item to the take-out port on condition that it has been confirmed that a customer who purchases the item has the purchase eligibility.

In the above configuration, the transport unit may transport the item to the take-out port on condition that information indicating that the customer has the purchase eligibility has been inputted by using the operation unit.

In the above configuration, the apparatus may further include a reading device configured to read eligibility information on the purchase eligibility from a medium storing the eligibility information. The transport unit may transport the item to the take-out port on condition that the reading device has read the eligibility information from a medium owned by the customer.

In the above configuration, the apparatus may further include a communication unit configured to receive, from an external apparatus that reads eligibility information on the purchase eligibility from a medium storing the eligibility information, information indicating whether or not the eligibility information has been read from the medium. The transport unit may transport the item to the take-out port on condition that the communication unit has received information indicating that the eligibility information has been read from a medium owned by the customer.

In the above configuration, the storage unit may have a storage port and an extraction port, and store therein items received from the storage port in such a manner that only one item, among a plurality of items being stored therein, is extracted from the extraction port to outside the storage unit. The transport unit may transport the one item extracted from the extraction port, to the take-out port.

In the above configuration, the transport unit may further include: a holding unit configured to extract an item from the extraction port of the storage unit; a rotation unit configured to rotate the holding unit; and a movement unit configured to move the holding unit.

In the above configuration, the holding unit may include: a tray on which the item can be placed; and a hook projecting upward from the tray. The storage unit may store therein a plurality of items by stacking the items in an up-down direction in such a manner that entire side surface of the lowermost item is exposed from the storage unit in a direction for extracting the lowermost item while exposing a portion of a lower surface and a portion of a back surface of the lowermost item from the storage unit. The transport unit may extract the lowermost item from the storage unit with the hook of the holding unit being caught on the back surface of the lowermost item, and place the extracted item on the tray to transport the item.

In the above configuration, the take-out port may further include a placement part on which an item to be taken out from the take-out port is placed, and a groove may be formed in the placement part. The transport unit may cause the tray to enter a space beneath the placement part such that the item on the tray is transferred onto the placement part while the hook passes into the groove, move downward to a position where the hook is separated from the item placed on the placement part and move backward, to transport the item to the take-out port.

An item take-out system according to the present disclosure is a system from which a user takes out an item. The system includes: a storage unit configured to store items therein; a plurality of take-out ports through which the user takes out an item from inside the item take-out apparatus; and a transport unit configured to extract an item from the storage unit and transport the item to any of the plurality of take-out ports. The transport unit may transport an item designated by the user to a take-out port, through which the user takes out the item, among the plurality of take-out ports. The user includes a clerk and a customer, for example.

As described above, the item take-out apparatus according to the present embodiment can store a plurality of kinds of items in a storage unit in the apparatus, and can transport an item designated by a user to a take-out port. The item take-out apparatus has a plurality of take-out ports, and can transport an item to a take-out port designated by the user, for example. This allows the user to take out a desired item from a desired take-out port. For example, the item take-out apparatus can transport an item to different take-out ports according to the kind of the item. For example, the item take-out apparatus can transport an item to different take-out ports according to the position of an operation terminal on which an operation of designating the item has been performed. Thus, the item take-out apparatus can deal with various styles of selling items in stores.

The invention claimed is:

1. A system for selling an item, comprising:

a storage unit configured to store items therein;

a plurality of take-out ports through which the user takes out an item from inside the system;

a transport unit configured to extract an item from the storage unit and transport the item to any of the plurality of take-out ports;

a payment apparatus configured to perform a payment process on the item;

a plurality of operation units; and a memory that stores information indicating correspondence between the respective operation units and the plurality of take-out ports, wherein when the item has been designated by using any one of the operation units and a user has completed the payment process on the designated item by using the payment apparatus, one of the plurality of take-out ports corresponding to the one operation unit is specified based on the information stored in the memory and the transport unit transports the item to the one take-out port corresponding to the one operation unit, the storage unit includes a storage port and an extraction port, and the storage unit is configured to store therein items received from the storage port in such a manner that only one item, among a plurality of items being stored therein, is extracted from the extraction port to outside the storage unit, the transport unit transports the one item extracted from the extraction port, to the one take-out port, the transport unit includes a holding unit configured to extract an item from the extraction port of the storage unit, the holding unit includes a tray on which the item can be placed, and a hook projecting upward from the tray, the storage unit is configured to store therein a plurality of items by stacking the items in an up-down direction in such a manner that entire side surface of the lowermost item is exposed from the storage unit in a direction for extracting the lowermost item while exposing a portion of a lower surface and a portion of a back surface of the lowermost item from the storage unit, and the transport unit extracts the lowermost item from the storage unit with the hook of the holding unit being caught on the back surface of the lowermost item, and places the extracted item on the tray to transport the item.

2. The system according to claim 1, wherein each of the plurality of take-out ports includes a placement part on which an item to be taken out from the take-out port is placed, and a groove is formed in the placement part, and the transport unit causes the tray to enter a space beneath the placement part such that the item on the tray is transferred onto the placement part while the hook passes into the groove, move downward to a position where the hook is separated from the item placed on the placement part and move backward, to transport the item to the one take-out port.

3. The system according to claim 1, wherein the transport unit further includes:

a rotation unit configured to rotate the holding unit; and a movement unit configured to move the holding unit.

4. The system according to claim 1, further comprising a communication unit configured to receive information indicating the item and the one take-out port.

5. The system according to claim 1, wherein at least one of the plurality of take-out ports is disposed in an exterior wall of a store so that the user takes out the item from outside the store.

6. The system according to claim 1, wherein at least one of the plurality of take-out ports is disposed in each of at least two surfaces out of four side surfaces, an upper surface and a lower surface that constitute a housing of the system.

7. The system according to claim 1, wherein at least one of the plurality of take-out ports is disposed in each of a plurality of surfaces of a housing of the system.

8. The system according to claim 1, wherein when the item for which purchase eligibility is required has been designated by using the one operation unit, the transport unit transports the item to the one take-out port on condition that it has been confirmed that a customer who purchases the item has the purchase eligibility.

9. The system according to claim 8, wherein the transport unit transports the item to the one take-out port on condition that information indicating that the customer has the purchase eligibility has been inputted by using the one operation unit.

10. The system according to claim 8, further comprising:

a reading device configured to read eligibility information on the purchase eligibility from a medium storing the eligibility information, wherein the transport unit transports the item to the one take-out port on condition that the reading device has read the eligibility information from a medium owned by the customer.

11. The system according to claim 8, further comprising:

a communication unit configured to receive, from an external apparatus that reads eligibility information on the purchase eligibility from a medium storing the eligibility information, information indicating whether or not the eligibility information has been read from the medium, wherein the transport unit transports the item to the one take-out port on condition that the communication unit has received information indicating that the eligibility information has been read from a medium owned by the customer.

* * * * *